(12) United States Patent
Brown et al.

(10) Patent No.: US 8,400,915 B1
(45) Date of Patent: Mar. 19, 2013

(54) PIPELINE SCHEDULER FOR A PACKET SWITCH

(75) Inventors: David Alan Brown, Carp (CA); Raghunath Reddy Kommidi, Hyderabad (IN); Sanjay T. Karambale, Kolhapur (IN)

(73) Assignee: Integrated Device Technology, Inc., San Jose, CA (US)

( * ) Notice: Subject to any disclaimer, the term of this patent is extended or adjusted under 35 U.S.C. 154(b) by 412 days.

(21) Appl. No.: 12/710,592

(22) Filed: Feb. 23, 2010

(51) Int. Cl.
*H04L 12/26* (2006.01)
*H04L 12/54* (2006.01)
*H04L 12/56* (2006.01)

(52) U.S. Cl. .................. 370/230; 370/412; 370/429

(58) Field of Classification Search ............... None
See application file for complete search history.

(56) References Cited

U.S. PATENT DOCUMENTS

| | | | |
|---|---|---|---|
| 2007/0253439 A1* | 11/2007 | Iny | 370/413 |
| 2008/0159145 A1* | 7/2008 | Muthukrishnan et al. | 370/235 |
| 2011/0164616 A1* | 7/2011 | Kloth et al. | 370/392 |

* cited by examiner

*Primary Examiner* — Marcus R Smith
(74) *Attorney, Agent, or Firm* — Kenneth Glass; Stanley J. Pawlik; Glass & Associates

(57) ABSTRACT

A packet switch includes a pipeline scheduler for scheduling packets according to a credit-based flow control protocol. A credit update pipeline stage initializes available credits for egress ports of the packet switch. A request pipeline stage generates packet requests for packets based on the available credits. A grant pipeline stage selects packets based on the ports requests and the available credits, and generates port grants for the selected packets. Additionally, the credit update stage updates the available credits based on the port grants. The packet switch routes the selected packets from ingress ports of the packet switch to the egress ports based on the port grants. In some embodiments, ingress ports generate enqueue requests based on the packets, an enqueue pipeline stage generates enqueue states based on the enqueue requests, and the request pipeline stage selects packets for routing based on the enqueue states and the available credits.

15 Claims, 18 Drawing Sheets

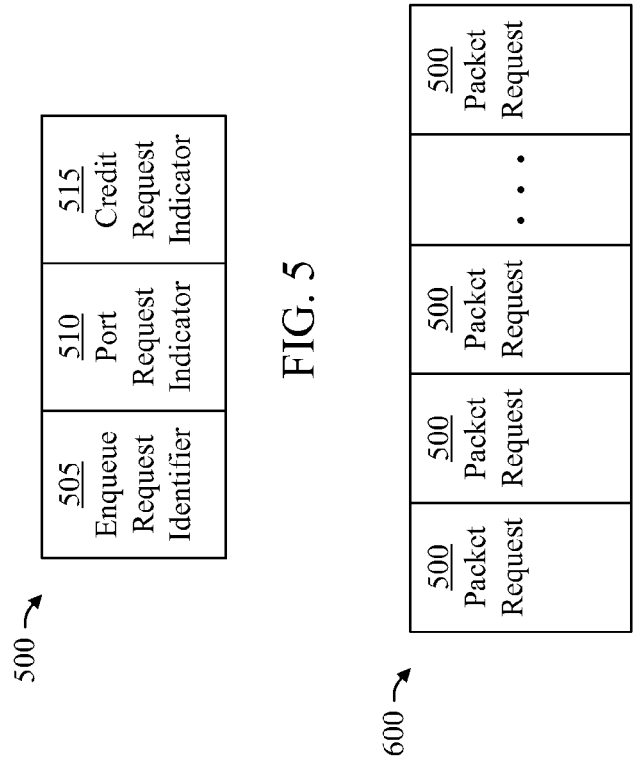
FIG. 5
FIG. 6
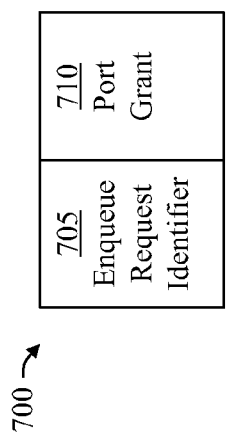
FIG. 7

| 710 | |
|---|---|
| 800 Egress Port Indicator | 805 Credit Grant Indicator |

FIG. 8

| 710 Port Grant | 710 Port Grant | 710 Port Grant | ... | 710 Port Grant |
|---|---|---|---|---|

| 1000 | |
|---|---|
| 1005 Advertised Header Credit Indicator | 1010 Advertised Data Credit Indicator |

FIG. 10

| 1000 Advertised Credit Indicator | 1000 Advertised Credit Indicator | 1000 Advertised Credit Indicator | ... | 1000 Advertised Credit Indicator |

| 1205 Available Header Credit Indicator |
| 1210 Available Data Credit Indicator |

| 1200 Available Credit Indicator | 1200 Available Credit Indicator | 1200 Available Credit Indicator | ... | 1200 Available Credit Indicator |

| 1705 Port Buffer Status Indicator | 1705 Port Buffer Status Indicator | 1705 Port Buffer Status Indicator | ... | 1705 Port Buffer Status Indicator |

| 1805 Port Availability Indicator | 1805 Port Availability Indicator | 1805 Port Availability Indicator | ... | 1805 Port Availability Indicator |

FIG. 18

PIPELINE SCHEDULER FOR A PACKET SWITCH

CROSS-REFERENCES TO RELATED APPLICATIONS

The present application is related to co-pending U.S. patent application Ser. No. 12/701,472 filed on Feb. 5, 2010 and entitled "Packet Switch with Enqueue Structure for Ordering Packets," which is incorporated herein by reference in its entirety.

BACKGROUND

A scheduler in a packet switch typically selects packets in a clock cycle of a clock signal in the packet switch. In turn, a switch fabric in the packet switch routes the selected packets through the switch fabric in this next clock cycle of the clock signal. In this way, the scheduler selects the packets in a scheduling cycle and the switch fabric routes the packets in a corresponding routing cycle.

In one type of packet switch, the scheduler schedules packets in a scheduling cycle based on a credit-based flow control protocol and according to ordering rules. Moreover, the scheduler performs scheduling functions in a single clock cycle of a clock signal in the packet switch. In this type of packet switch, the scheduler identifies packets stored in ingress ports of the packet switch for routing to egress ports of the packet switch based on credits advertised by the egress ports. The scheduler then selects at least some of the identified packets stored in the ingress ports that may be simultaneously routed from the ingress ports to egress ports of the packet switch through the switch fabric. Additionally, the scheduler updates the credits advertised by the egress ports based on credits consumed for routing the selected packets. Further, the scheduler updates the credits advertised by the egress ports based on credits released when packets are output from the egress ports. Because the scheduler performs all of these scheduling functions in a single clock cycle of the clock signal, a maximum frequency of the clock signal is often constrained by propagation delays in logic circuitry of the scheduler for performing the scheduling functions, which in turn constrains maximum packet throughput of the packet switch.

Furthermore, the packet switch determines an order for routing packets from an ingress port of the packet switch to egress ports of the packet switch based on the ordering rules. The ordering rules indicate when a packet in a sequence of packets received at an ingress port of the packet switch is allowed or required to be routed ahead of a previous packet in the sequence when the previous packet is blocked in the packet switch. Because the packet switch routes packets from the ingress port to the egress ports based on the ordering rules, logic circuitry of the scheduler for performing the scheduling functions is more complex than other packet switches that do not implement the ordering rules. As a result, propagation delays in the logic circuitry of the scheduler for performing the scheduling functions are increased as compared to these other packet switches that do not implement the ordering rules.

SUMMARY

In various embodiments, a packet switch includes a pipeline scheduler having pipeline stages for scheduling packets according to a credit-based flow control protocol. A credit update pipeline stage initializes available credits for egress ports of the packet switch. A request pipeline stage generates packet requests for packets based on the available credits. A grant pipeline stage selects packets based on the packets requests and generates port grants for the selected packets. A switch fabric of the packet switch routes the selected packets to egress ports of the packet switch based on the port grants. Additionally, the credit update stage updates the available credits based on the grants.

Because the pipeline scheduler includes pipeline stages, the pipeline scheduler schedules packets at a higher clock rate than systems that implement a credit-based flow control protocol but do not include a pipeline scheduler for scheduling packets. As a result, packet throughput of the packet switch including the pipeline scheduler is increased in comparison to these other systems.

In further embodiments, ingress ports of the packet switch generate enqueue requests for the packets. The enqueue requests for packets stored in an ingress port include data for routing the packet from the ingress port to egress ports of the packet switch based on ordering rules. In this way, the packet switch determines a routing order for the packets stored in the ingress port based on the ordering rules. Moreover, the pipeline scheduler includes an enqueue pipeline stage configured to store an enqueue state for each ingress port based on the enqueue requests generated by the ingress port, and the request pipeline stage is configured to generate the packet requests based on both the available credits and the enqueue states.

Because the packet switch generates enqueue requests in the enqueue pipeline stage, the pipeline scheduler schedules packets more quickly than embodiments of the pipeline scheduler that do not include the enqueue pipeline stage. Moreover, because the pipeline scheduler includes pipeline stages, the pipeline scheduler schedules packets at a higher clock rate than systems that implement a credit-based flow control protocol and route packets according to ordering rules but do not include a pipeline scheduler for scheduling packets. As a result, packet throughput of the packet switch including the pipeline scheduler is increased in comparison to these other systems.

A packet switch, in accordance with one embodiment, includes ingress ports, egress ports, a pipeline scheduler, and a switch fabric. The pipeline scheduler is coupled to the ingress ports and the egress ports. Additionally, the switch fabric is coupled to the ingress ports, the egress ports, and the pipeline scheduler. The ingress ports are configured to receive packets. The egress ports are configured to advertise credits corresponding to the egress ports. The pipeline scheduler includes a request pipeline stage, a grant pipeline stage, and a credit update pipeline stage. The request pipeline stage is configured to generate packet requests corresponding to the packets based on an available credit state and store a packet request state including the packet requests. Each of the packet requests identifies a packet, at least one of the egress ports as a destination egress port for the packet, and credits requested for routing the packet to the destination egress port. The grant pipeline stage is configured to select packets based on the packet request state, generate port grants corresponding to the selected packets, and store a port grant state including the port grants. The credit update pipeline stage is configured to initialize the available credit state based on the advertised credits, store the available credit state, and update the available credit state based on the port grant state. The switch fabric is configured to route each of the selected packets to each destination egress port of the selected packet.

A packet switch, in accordance with one embodiment, includes ingress ports, egress ports, a pipeline scheduler, and a switch fabric. The pipeline scheduler is coupled to the ingress ports and the egress ports. Additionally, the switch fabric is coupled to the ingress ports, the egress ports, and the pipeline scheduler. The ingress ports are configured to receive packets and generate enqueue requests corresponding to the packets. The egress ports are configured to advertise credits corresponding to the egress ports. The pipeline scheduler includes an enqueue pipeline stage, a request pipeline stage, a grant pipeline stage, and a credit update pipeline stage. The enqueue pipeline stage includes enqueue modules corresponding to the ingress ports. The enqueue modules are configured to generate enqueue states corresponding to the ingress ports. Each of the enqueue states includes the enqueue requests generated by the corresponding ingress port. The enqueue pipeline stage is further configured to store the enqueue states. The request pipeline stage is configured to select enqueue requests corresponding to the ingress ports based on the enqueue states and an available credit state including available credit indicators for the egress ports. The request pipeline stage is further configured to generate packet requests corresponding to the selected enqueue requests based on the available credit state, and store a packet request state including the packet requests. Each of the packet requests identifies a packet, at least one of the egress ports as a destination egress port for the packet, and credits requested for routing the packet to the destination egress port. The grant pipeline stage is configured to select packets based on the packet request state, generate port grants corresponding to the selected packets, and store a port grant state including the port grants. The credit update pipeline stage is further configured to initialize the available credit state based on the advertised credits, store the available credit state, and update the available credit state based on the port grant state. The switch fabric is configured to route each of the selected packets to each destination egress port of the selected packet.

A method of routing packets through a packet switch, in accordance with one embodiment, includes advertising credits corresponding to egress ports of a packet switch. The method also includes initializing an available credit state including available credits corresponding to the egress ports based on the advertised credits, and storing the available credit state in a credit update pipeline stage of the packet switch. The method further includes receiving packets at ingress ports of the packet switch and generating packet requests corresponding to the packets based on the available credit state. Each of the packet requests identifies a packet, at least one of the egress ports as a destination egress port for the packet, and credits for routing the packet to the destination egress port of the packet. Additionally, the method includes storing a packet request state including the packet requests in a request pipeline stage of the packet switch, selecting packets based on the packet request state, generating port grants corresponding to the selected packets, and storing a port grant state including the port grants in a grant pipeline stage of the packet switch. The method also includes routing each of the selected packets to each destination egress port of the selected packet.

Because the method schedules packets in pipeline stages of a packet switch according to a credit-based flow control protocol, the method selects packets for routing at a higher clock rate than methods implementing a credit-based flow control protocol that do not schedule packets in pipeline stages. As a result, the method increases packet throughput of the packet switch as compared to a method implementing a credit-based flow control protocol that does not schedule packets in pipeline stages.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 5 is a block diagram of a packet request, in accordance with an embodiment of the present invention.

FIG. 6 is a block diagram of a packet request state, in accordance with an embodiment of the present invention.

FIG. 7 is a block diagram of a packet grant, in accordance with an embodiment of the present invention.

FIG. 8 is a block diagram of a port grant, in accordance with an embodiment of the present invention.

FIG. 9 is a block diagram of a port grant state, in accordance with an embodiment of the present invention.

FIG. 10 is a block diagram of an advertised credit indicator, in accordance with an embodiment of the present invention.

FIG. 11 is a block diagram of an advertised credit state, in accordance with an embodiment of the present invention.

FIG. 12 is a block diagram of an available credit indicator, in accordance with an embodiment of the present invention.

FIG. 13 is a block diagram of an available credit state, in accordance with an embodiment of the present invention.

FIG. 17 is a block diagram of a port buffer state, in accordance with an embodiment of the present invention.

FIG. 18 is a block diagram of a port availability state, in accordance with an embodiment of the present invention.

DETAILED DESCRIPTION

In various embodiments, a packet switch includes a pipeline scheduler for scheduling packets according to a credit-based flow control protocol. The pipeline scheduler includes a request pipeline stage, a grant pipeline stage, and a credit update pipeline stage. The credit update pipeline stage initializes available credits for egress ports of the packet switch. The request pipeline stage generates packet requests for packets received by ingress ports of the packet switch based on the available credits. The grant pipeline stage selects packets based on the ports requests and generates port grants for the selected packets. A switch fabric of the packet switch routes the selected packets from ingress ports to egress ports of the packet switch based on the port grants. Additionally, the credit update stage updates the available credits based on the port grants. Because the pipeline scheduler schedules packets in pipeline stages, the pipeline scheduler selects packets for routing at a higher clock rate than systems implementing a credit-based flow control protocol that do not include pipeline stages. As a result, packet throughput of the packet switch is increased as compared to a system that implements a credit-based flow control protocol but does not include a pipeline scheduler.

In some embodiments, the packet switch includes an enqueue pipeline stage. In these embodiments, the ingress ports generate enqueue requests for the packets and the enqueue pipeline stage stores an enqueue state for each of the ingress ports based on the enqueue requests generated by the ingress port. Moreover, the request pipeline stage generates packet requests based on the enqueue states and the available credits. Because the packet switch generates enqueue requests in the enqueue pipeline stage, the pipeline scheduler schedules packets more quickly than embodiments of the pipeline scheduler that do not include the enqueue pipeline stage.

Figure 1:
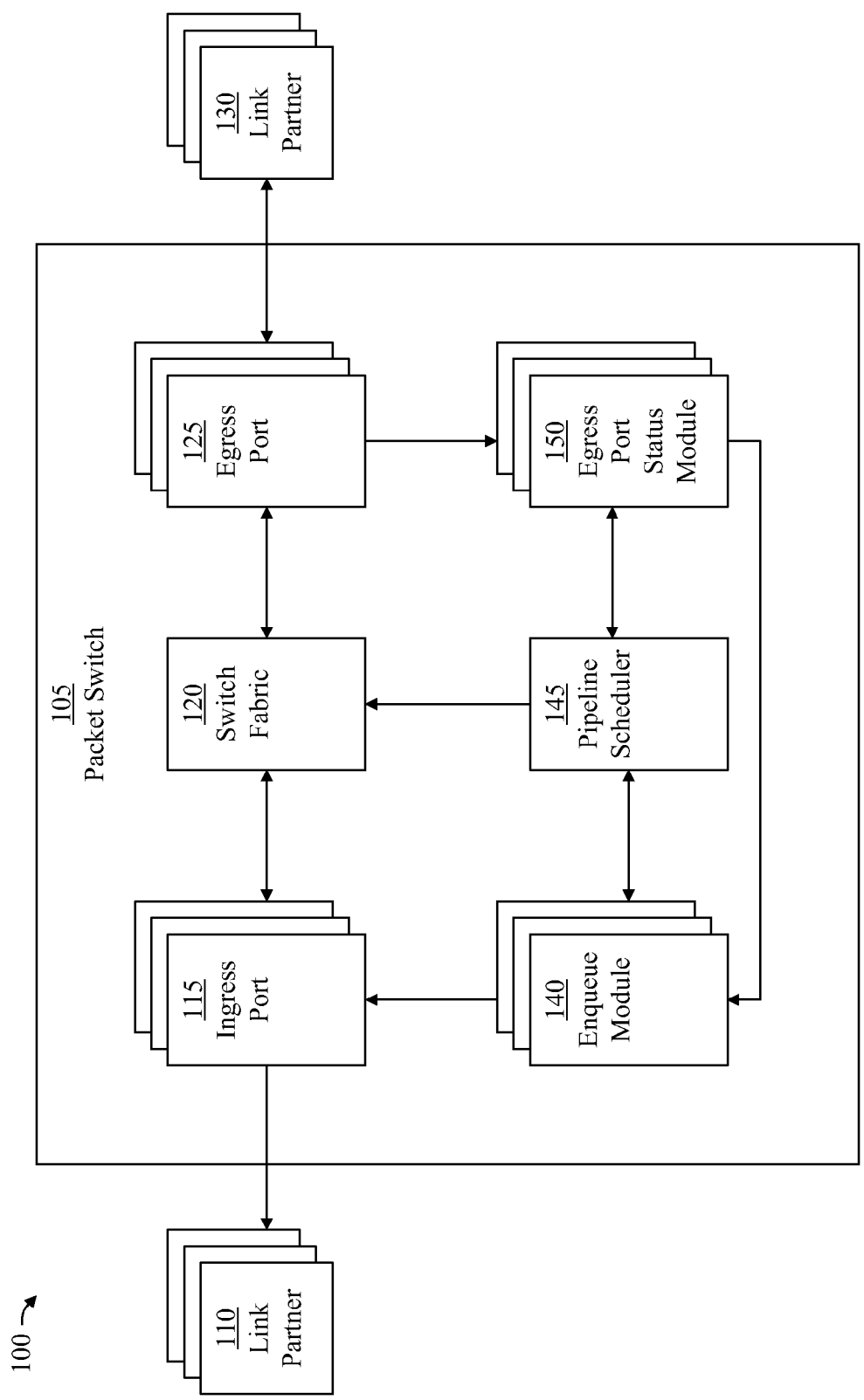
FIG. 1 is a block diagram of communication system, in accordance with an embodiment of the present invention.

FIG. 1 illustrates a communication system 100, in accordance with an embodiment of the present invention. The communication system 100 includes link partners 110 (e.g., ingress link partners), a packet switch 105, and link partners 130 (e.g., egress link partners). Each of the link partners 110 and each of the link partners 130 is coupled (e.g., connected) to the packet switch 105. In various embodiments, the packet switch 105 routes packets between the link partners 110 and the link partners 130. For example, the packet switch 105 may route a header packet, which includes a packet header but does not include a data payload, from a link partner 110 to a link partner 130. As another example, the packet switch 105 may route a data packet, which includes a packet header and a data payload, from a link partner 110 to a link partner 130.

The packet switch 105 includes ingress ports 115 corresponding to the link partners 110, each of which is coupled (e.g., connected) to the corresponding link partner 110. Additionally, the packet switch 105 includes egress ports 125 corresponding to the link partners 130, each of which is coupled (e.g., connected) to the corresponding link partner 130. The packet switch 105 further includes a switch fabric 120, enqueue modules 140, a pipeline scheduler 145, and egress port status modules 150. The enqueue modules 140 are coupled (e.g., connected) to corresponding ingress ports 115. The egress port status modules 150 are coupled (e.g., connected) to corresponding egress ports 125. The switch fabric 120 is coupled (e.g., connected) to the ingress ports 115, the egress ports 125, and the pipeline scheduler 145. Additionally, the pipeline scheduler 145 is coupled (e.g., connected) to the enqueue modules 140 and the egress port status modules 150.

In various embodiments, each of the ingress ports 115 receives packets from the link partner 110 corresponding to the ingress port 115 in a sequential order, stores the packets, and generates enqueue requests corresponding the packets. In turn, the enqueue module 140 corresponding to the ingress port 115 stores the enqueue requests. Each of the enqueue requests generated by an ingress port 115 identifies the corresponding packet stored in the ingress port 115 and includes data for determining a routing order for routing the packets from the ingress port 115 to the egress ports 125.

In various embodiments, the pipeline scheduler 145 schedules packets stored in the ingress ports 115 for routing based on the enqueue requests generated by the ingress ports 115 and credits available for the egress ports 125. Moreover, the pipeline scheduler 145 schedules the packets for routing in pipeline stages according to a credit-based flow control protocol. Additionally, the pipeline scheduler 145 configures the switch fabric 120 for routing the scheduled packets to the egress ports 125 of the packet switch 105. For example, the pipeline scheduler 145 may provide configuration data to the switch fabric 120 for configuring switches in the switch fabric 120. Because the pipeline scheduler 145 schedules packets for routing in pipeline stages, the pipeline scheduler 145 schedules packets at a higher clock rate than systems implementing a credit-based flow control protocol that do not include pipeline stages for scheduling packets. As a result, packet throughput of the packet switch 105 is increased.

In some embodiments, the data in an enqueue request for determining a routing order for the corresponding packet is based on a set of ordering rules. The set of ordering rules indicates when a packet (i.e., a subsequent packet) received at an ingress port 115 is to be routed ahead of a packet previously received at the ingress port 115 (i.e., a previous packet) when the previous packet is blocked in the ingress port 115. Moreover, the packet switch 105 determines a routing order for packets received by an ingress port 115 in a sequential order by modifying the sequential order based on the set of ordering rules. In this way, the packet switch 105 reorders the packets received at the ingress port 115 and prevents deadlock and inconsistent data from occurring in a distributed consumer ordering model for the packet switch 105.

In various embodiments, each of the egress ports 125 advertises credits indicating an available storage capacity of the egress port 125 for accepting a packet. In this way, the egress ports 125 advertise credits to the pipeline scheduler 145 according to the credit-based flow control protocol of the packet switch 105. In turn, each of the egress port status modules 150 indicates available credits for the egress port 125 corresponding to the egress port status module 150 based on the advertised credits of the egress port 125. Because the pipeline scheduler 145 schedules packets for routing in pipeline stages, the credits available for an egress port 125 may be less than the credits advertised for the egress port 125, as is described more fully herein.

In some embodiments, the pipeline scheduler 145 identifies one or more packets to be routed to an egress port 125 and predecrements the credits available for the egress port 125 in a pipeline stage of the pipeline scheduler 145 by a minimum number of credits for routing a packet to the egress port 125. In this way, the pipeline scheduler 145 updates the credits available for the egress port 125 based on the minimum number of credits. Furthermore, the pipeline scheduler 145 selects one of the identified packets for routing to the egress port 125 in a subsequent pipeline stage of the pipeline scheduler 145 and selectively adjusts the credits available for the egress port 125 based on credits requested for routing the selected packet to the egress port 125. For example, the pipeline scheduler 145 may decrement the available credits for the egress port 125 by a number of additional credits to indicate the credits requested for routing the selected packet to the egress port 125. In this way, the pipeline scheduler 145 updates the credits available for an egress port 125 in a previous pipeline stage of the pipeline scheduler 145 based on a minimum number of credits and updates the credits available for the egress port 125 in a subsequent pipeline stage of the pipeline scheduler 145 based on credits requested by a packet selected for routing to the egress port 125.

In some embodiments, each of the egress port status modules 150 also indicates when the egress port 125 corresponding to the egress port status module 150 is busy. When an egress port 125 is busy, the egress port 125 is not presently able to accept a packet although the egress port 125 may have storage capacity for accepting the packet. For example, the egress port 125 may be busy when the egress port 125 is receiving and storing another packet. Further in this example, an egress port 125 may accept a packet if the egress port 125 is advertising sufficient credits for storing the packet (i.e., the egress port 125 has sufficient storage capacity for storing the packet) and the egress port 125 is not busy.

In some embodiments, the packet switch 105 is implemented in an integrated circuit of an integrated circuit device which may include an integrated circuit package containing the integrated circuit. In some embodiments, the packet switch 105 is implemented in more than one integrated circuit of an integrated circuit device which may include a multichip package containing the integrated circuits. In some embodiments, the pipeline scheduler 145 is implemented in an integrated circuit of an integrated circuit device which may include an integrated circuit package containing the integrated circuit. In some embodiments, the pipeline scheduler 145 is implemented in more than one integrated circuit of an integrated circuit device which may include a multichip package containing the integrated circuits.

In various embodiments, the packet switch 105 implements a set of ordering rules for routing packets through the packet switch 105 as is specified in a Peripheral Component Interconnect Express (PCIe) Specification. In some embodiments, the packet switch 105 implements a set of ordering rules specified in the PCIe Base 2.0 specification or the PCIe Base Revision 2.1 specification, each of which is incorporated herein by reference. In some embodiments, the packet switch 105 implements more than one set of ordering rules specified in a PCIe specification. In these embodiments, the packet switch 105 selects a set of ordering rules, for example based on input to the packet switch 105, and implements the selected set of ordering rules. In various embodiments, the packet switch 105 implements permissive passing rules of the PCI Express Base 2.0 specification that are not implemented in other systems. As a result, packet throughput of the packet switch 105 is increased as compared to systems that do not implement all of the permissive passing rules implemented in the packet switch 105.

Figure 2:
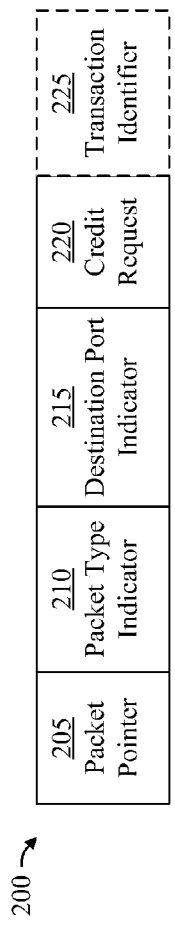
FIG. 2 is a block diagram of an enqueue request, in accordance with an embodiment of the present invention.

FIG. 2 illustrates an enqueue request 200, in accordance with an embodiment of the present invention. The enqueue request 200 corresponds to a packet stored in an ingress port 115 and includes a packet pointer 205, a packet type indicator 210, a destination port indicator 215, a credit request 220, and an optional transaction identifier 225. For example, the enqueue request 200 may be an enqueue record including fields for storing the packet pointer 205, the packet type indicator 210, the destination port indicator 215, the credit request 220, and the transaction identifier 225.

The packet pointer 205 of the enqueue request 200 identifies the corresponding packet stored in the ingress port 115. The packet type indicator 210 of the enqueue request 200 identifies a type of the packet (i.e., a packet type) corresponding to the enqueue request 200. For example, the packet type may be a posted request, a non-posted request, or a completion, as specified in a PCIe specification. In various embodiments, the packet type indicator 210 is a packet type flag including one or more data bits for identifying the packet type of the packet identified by the packet pointer 205 in the enqueue request 200. In some embodiments, the packet type indicator 210 has a one-hot encoding in which each data bit of the packet type indicator 210 corresponds to a packet type and indicates whether the packet identified by the packet pointer 205 of the enqueue request 200 has the packet type.

The destination port indicator 215 identifies each egress port 125 that is a destination egress port 125 of the packet identified by the packet pointer 205 in the enqueue request 200. For example, the destination port indicator 215 may be a port map including data bits corresponding to the egress ports 125. In this example, the destination port indicator 215 may have a single data bit set to identify a single egress port 125 as a destination egress port 125 for a unicast packet (i.e., a packet that has a single destination). Further in this example, the destination port indicator 215 may have more than one data bit set to identify more than one egress port 125 as a destination egress port 125 for a multicast packet (i.e., a packet that has more than one destination).

The credit request 220 indicates a number of credits for routing the packet identified by the packet pointer 205 to an egress port 125. In some embodiments, the packet type indicator 210 in combination with the credit request 220 identifies both a number and type of credits for routing the packet identified by the packet pointer 205 to an egress port 125. For example, the packet type indicator 210 may indicate that the packet identified by the packet pointer 205 is a posted request and the credit request 220 may indicate that one header credit and one data credit is requested for routing the packet to an egress port 125. In this example, the packet type indicator 210 in combination with the credit request 220 indicates that one posted header credit and one posted data credit are requested for routing the packet identified by the packet pointer 205 to an egress port 125.

The transaction identifier 225 identifies a transaction for the packet identified by the packet pointer 205. In various embodiments, the transaction identifier 225 is based on a transaction identifier value in the packet header of the packet identified by the packet pointer 205. Moreover, the transaction identifier 225 may identify a transaction sequence for packets having the same transaction identifier value in the packet headers of the packets. In some embodiments, the ingress port 115 that generates the enqueue request 200 for a packet generates the transaction identifier 225 of the enqueue request 200, for example based on the contents of the packet.

Figure 3:
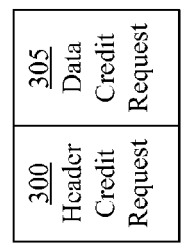
FIG. 3 is a block diagram of a credit request, in accordance with an embodiment of the present invention.

FIG. 3 illustrates the credit request 220, in accordance with an embodiment of the present invention. The credit request 220 includes a header credit request 300 and a data credit request 305. The header credit request 300 indicates a number of header credits requested for the packet identified by the enqueue request 200 including the header credit request 300. The data credit request 305 indicates a number of data credits requested for the packet identified by the enqueue request 200 including the data credit request 305.

Figure 4:
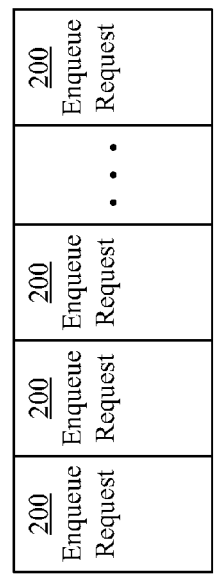
FIG. 4 is a block diagram of an enqueue state, in accordance with an embodiment of the present invention.

FIG. 4 illustrates an enqueue state 400, in accordance with an embodiment of the present invention. In various embodiments, the enqueue module 140 corresponding to an ingress port 115 stores enqueue requests 200 generated by the ingress port 115 and generates an enqueue state 400 for the ingress port 115 based on the enqueue requests 200 stored in the enqueue module 140. In some embodiments, the enqueue state 400 includes the enqueue requests 200 stored in the enqueue module 140 and indicates the sequential order of the enqueue requests 200 stored in the enqueue module 140.

In some embodiments, the enqueue module 140 generates the enqueue state 400 by storing the enqueue requests 200 generated by the ingress port 115 corresponding to the enqueue module 140. For example, the enqueue module 140 may store the enqueue requests 200 into a memory device, such as a first-in-first-out (FIFO) queue. Moreover, the memory device indicates the sequential order of the enqueue requests 200 stored in the enqueue module 140, for example based on storage locations containing the enqueue requests 200 in the memory device.

FIG. 5 illustrates a packet request 500, in accordance with an embodiment of the present invention. In various embodiments, the pipeline scheduler 145 selects an enqueue request 200 corresponding to an ingress port 115 and identifying a packet stored in the ingress port 115, and generates a packet request 500 corresponding to the packet based on the enqueue request 200. The packet request 500 identifies the enqueue request 200 and one or more egress ports 125 as a destination egress port 125 for the packet identified by the enqueue request 200. Additionally, the packet request 500 indicates credits requested for routing the packet to the destination egress port 125 of the packet.

In various embodiments, the packet request 500 includes an enqueue request identifier 505, a port request indicator 510, and a credit request indicator 515. The enqueue request identifier 505 identifies the enqueue request 200 corresponding to the packet request 500. Moreover, the packet request 500 corresponds to the packet identified by the packet pointer 205 of the enqueue request 200. The port request indicator 510 identifies one or more destination egress port 125 of the packet. The credit request indicator 515 indicates the credits requested for routing the packet to each destination egress port 125 of the packet. For example, the credit request indicator 515 may indicate both header credits and data credits requested for routing the packet to a destination egress port 125 of the packet.

FIG. 6 illustrates a packet request state 600, in accordance with an embodiment of the present invention. In various embodiments, the pipeline scheduler 145 generates packet requests 500 corresponding to ingress ports 115 of the packet switch 105, generates a packet request state 600 based on the packet requests 500, and stores the packet request state 600. In this way, the pipeline scheduler 145 generates a packet request 500 for a packet stored in the ingress port 115 corresponding to the packet request 500. In some embodiments, the packet request state 600 includes the packet requests 500 generated by the pipeline scheduler 145. Moreover, the pipeline scheduler 145 stores the packet request state 600 by storing the packet requests 500.

FIG. 7 illustrates a packet grant 700, in accordance with an embodiment of the present invention. In various embodiments, the pipeline scheduler 145 selects a packet request 500 corresponding to a packet stored in an ingress port 115 and generates a packet grant 700 corresponding to the packet based on a packet request 500. In this way, the pipeline scheduler 145 selects the packet for routing to one or more destination egress ports 125 of the packet. The packet grant 700 identifies an enqueue request 200 of a packet, one or more destination egress ports 125 of the packet, and credits granted for routing the packet to a destination egress port 125 of the packet.

In various embodiments, the packet grant 700 includes an enqueue request identifier 705 and a port grant 710. The enqueue request identifier 705 identifies the enqueue request 200 of the packet corresponding to the packet grant 700. The port grant 710 identifies one or more destination egress ports 125 of the packet corresponding to the packet grant 700 and indicates credits granted for routing the packet to each destination egress port 125 of the packet identified by the packet grant 700.

FIG. 8 illustrates the port grant 710, in accordance with an embodiment of the present invention. The port grant 710 identifies one or more egress ports 125 as a destination egress port 125 of the packet corresponding to the port grant 710. Additionally, the port grant 710 indicates credits granted for routing the packet to a destination egress port 125 of the packet.

In various embodiments, the port grant 710 of a packet includes an egress port indicator 800 and a credit grant indicator 805. The egress port indicator 800 identifies one or more destination egress ports 125 of the packet corresponding to the port grant 710. The credit grant indicator 805 indicates credits granted for routing the packet to each destination egress port 125 of the packet identified by the egress port indicator 800.

In various embodiments, the pipeline scheduler 145 generates the egress port indicator 800 of the port grant 710 corresponding to a packet based on the port request indicator 510 of the packet request 500 corresponding to the packet. Moreover, the egress port indicator 800 of the port grant 710 identifies each egress port 125 identified by the port request indicator 510 of the packet request 500 for which the pipeline scheduler 145 has issued a grant for the packet. Additionally, the pipeline scheduler 145 generates the credit grant indicator 805 of the port grant 710 corresponding to a packet based on the credit request indicator 515 of the packet request 500 corresponding to the packet. For example, the credit grant indicator 805 of the port grant 710 may be the same as the credit request indicator 515 of the packet request 500.

FIG. 9 illustrates a port grant state 900, in accordance with an embodiment of the present invention. In various embodiments, the pipeline scheduler 145 generates a port grant state 900 based on port grants 710 generated by the pipeline scheduler 145. Additionally, the pipeline scheduler 145 stores the port grant state 900. In some embodiments, the port grant state 900 includes the port grants 710 generated by the pipeline scheduler 145. Moreover, the pipeline scheduler 145 stores the port grant state 900 by storing the port grants 710.

FIG. 10 illustrates an advertised credit indicator 1000, in accordance with an embodiment of the present invention. In various embodiments, each of the egress ports 125 generates an advertised credit indicator 1000 for a corresponding egress port 125 indicating credits advertised for the egress port 125.

In various embodiments, the advertised credit indicator 1000 includes an advertised header credit indicator 1005 and an advertised data credit indicator 1010. The advertised header credit indicator 1005 indicates header credits advertised for the egress port 125 corresponding to the advertised credit indicator 1000. The advertised data credit indicator 1010 indicates data credits advertised for the egress port 125 corresponding to the advertised credit indicator 1000.

FIG. 11 illustrates an advertised credit state 1100, in accordance with an embodiment of the present invention. In various embodiments, the egress port status modules 150 collectively generate the advertised credit state 1100 based on the advertised credit indicators 1000. Additionally, the egress port status modules 150 collectively store the advertised credit state 1100. In some embodiments, the advertised credit state 1100 includes the advertised credit indicators 1000 generated by the egress ports 125. Moreover, the egress port status modules 150 collectively store the advertised credit state 1100 by storing the advertised credit indicators 1000.

FIG. 12 illustrates an available credit indicator 1200, in accordance with an embodiment of the present invention. In various embodiments, an egress port status module 150 generates the available credit indicator 1200 for a corresponding egress port 125 based on the advertised credit indicator 1000 of the egress port 125. The available credit indicator 1200 indicates credits advertised by the egress port 125 that are available in the credit-based flow control protocol of the packet switch 105.

In various embodiments, the available credit indicator 1200 includes an available header credit indicator 1205 and an available data credit indicator 1210. The available header credit indicator 1205 indicates header credits available for the egress port 125 corresponding to the available credit indicator 1200. The available data credit indicator 1210 indicates data credits available for the egress port 125 corresponding to the available credit indicator 1200.

FIG. 13 illustrates an available credit state 1300, in accordance with an embodiment of the present invention. In various embodiments, the pipeline scheduler 145 generates an available credit state 1300 based on the available credit indicators 1200 generated by the pipeline scheduler 145. Additionally, the pipeline scheduler 145 stores the available credit state 1300. In some embodiments, the available credit state 1300 includes the available credit indicators 1200 generated by the pipeline scheduler 145. Moreover, the pipeline scheduler 145 stores the available credit state 1300 by storing the available credit indicators 1200.

Figure 14:
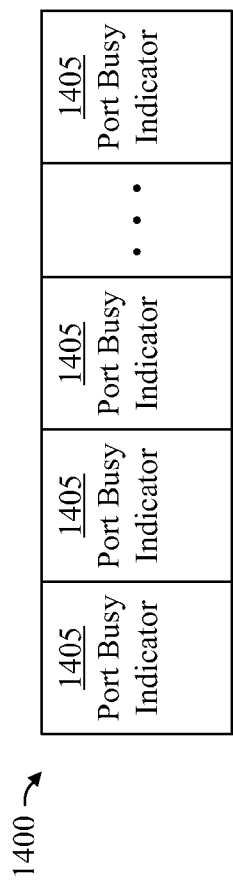
FIG. 14 is a block diagram of a port busy state, in accordance with an embodiment of the present invention.

FIG. 14 illustrates a port busy state 1400, in accordance with an embodiment of the present invention. In various embodiments, the pipeline scheduler 145 generates port busy indicators 1405 corresponding to the egress ports 125. Each of the port busy indicators 1405 indicates whether the egress port 125 is busy. Additionally, the pipeline scheduler 145 generates the port busy state 1400 based on the port busy indicators 1405 and stores the port busy state 1400. In some embodiments, the port busy state 1400 includes the port busy indicators 1405 generated by the pipeline scheduler 145. Moreover, the pipeline scheduler 145 stores the port busy state 1400 by storing the port busy indicators 1405.

In some embodiments, the port busy indicator 1405 of an egress port 125 indicates a number of clock cycles of a clock signal in the packet switch 105 in which the egress port 125 will be busy. Because the port busy indicator of an egress port 125 indicates a number of clock cycles in which the egress ports 125 will be busy, the pipeline scheduler 145 may identify a packet for routing to the egress port 125 in a clock cycle of the clock signal (e.g., a request cycle) when the egress port 125 is busy and schedule the packet for routing to the egress port 125 a subsequent clock cycle of the clock signal (e.g., a scheduling cycle) such that the egress port 125 will no longer be busy in the subsequent clock cycle. In this way, the pipeline scheduler 145 may identify a packet in a pipeline stage of the pipeline scheduler 145 for routing to an egress port 125 when the egress port 125 is busy and schedule the packet in a subsequent pipeline stage of the pipeline scheduler 145 packet for routing to the egress port 125 when the egress port 125 is not busy (i.e., no longer busy).

Figure 15:
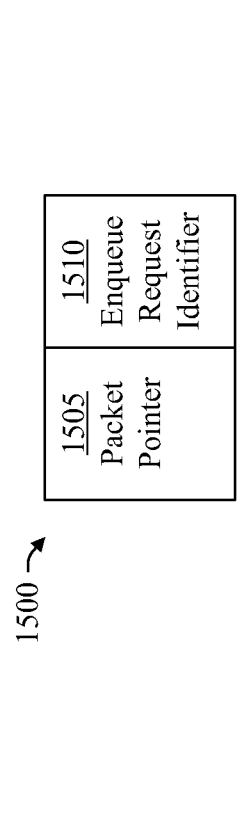
FIG. 15 is a block diagram of a dequeue request, in accordance with an embodiment of the present invention.

FIG. 15 illustrates a dequeue request 1500, in accordance with an embodiment of the present invention. In various embodiments, an enqueue module 140 receives a packet grant 700 from the pipeline scheduler 145 for a packet stored in the ingress port 115 corresponding to the enqueue module 140. In turn, the enqueue module 140 generates a dequeue request 1500 corresponding to the packet based on the packet grant 700. The dequeue request 1500 identifies the packet stored in the ingress port 115 and the enqueue request 200 corresponding to the packet. For example, the dequeue request 1500 may identify a storage location storing the packet in the ingress port 115 and a storage location storing the enqueue request 200 in the enqueue module 140. Moreover, the ingress port 115 removes (e.g., deletes) the packet from the ingress port 115 based on the dequeue request 1500 and the enqueue module 140 removes (e.g., deletes) the enqueue request 200 of the packet from the enqueue module 140 based on the dequeue request 1500.

In various embodiments, the dequeue request 1500 includes a packet pointer 1505 and an enqueue request identifier 1510. The packet pointer 1505 identifies the packet corresponding to the dequeue request 1500 and the enqueue request identifier 1510 identifies the enqueue request 200 corresponding to the packet (i.e., the enqueue request 200 identifying the packet). For example, the enqueue request identifier 1510 in the dequeue request 1500 may be the same as the enqueue request identifier 705 in the packet grant 700. Further in this example, the packet pointer 1505 in the dequeue request 1500 may be the same as the packet pointer 205 in enqueue request 200 identified by the enqueue request identifier 705 in the packet grant 700.

Figure 16:
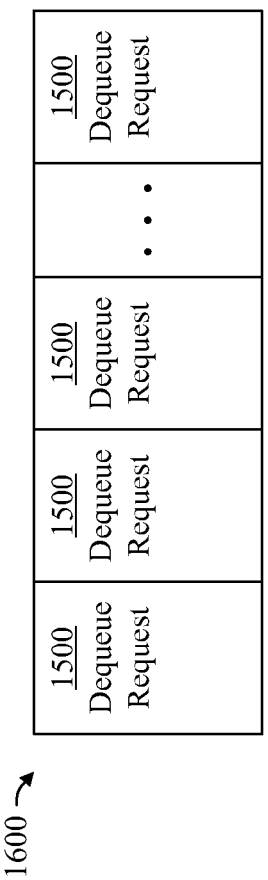
FIG. 16 is a block diagram of a dequeue request state, in accordance with an embodiment of the present invention.

FIG. 16 illustrates a dequeue request state 1600, in accordance with an embodiment of the present invention. In various embodiments, the enqueue modules 140 collectively generate the dequeue request state 1600 based on the dequeue requests 1500 generated by the enqueue modules 140. In some embodiments, the dequeue request state 1600 includes the dequeue requests 1500 generated by the enqueue modules 140. Moreover, the enqueue modules 140 collectively store the dequeue request state 1600 by storing the dequeue requests 1500 in the dequeue request state 1600 among the enqueue modules 140.

FIG. 17 illustrates a port buffer state 1700, in accordance with an embodiment of the present invention. In various embodiments, the pipeline scheduler 145 generates port buffer status indicators 1705 corresponding to the egress ports 125 and stores a port buffer state 1700 based on the port buffer status indicators 1705. Each of the port buffer status indicators 1705 indicates an available storage capacity of a buffer in the corresponding egress port 125 for storing a packet. In some embodiments, the port buffer state 1700 includes the port buffer status indicators 1705 generated by the pipeline scheduler 145. Moreover, the pipeline scheduler 145 stores the port buffer state 1700 by storing the port buffer status indicators 1705.

In various embodiments, the pipeline scheduler 145 determines whether an egress port 125 has sufficient credits for accepting a packet based on credits available for the egress port 125 and credits requested for routing the packet to the egress port 125. For example, the pipeline scheduler 145 may determine whether the egress port 125 has sufficient credits for accepting the packet based on the available credit indicator 1200 of the egress port 125 and the credit request indicator 515 in the packet request 500 of the packet. In this example, the egress port 125 has sufficient credits for accepting the packet if a number of available credits for the egress port 125 as indicated by the available credit indicator 1200 of the egress port 125 is equal to or greater than a number of credits requested for the egress port 125 as indicated by the credit request indicator 515 in the packet request 500 of the packet.

Additionally, the pipeline scheduler 145 determines whether a buffer in the egress port 125 has available storage capacity for storing the packet based on a size of the packet (e.g., a packet length of the packet) and the port buffer status indicator 1705 of the egress port 125. For example, the pipeline scheduler 145 may determine the size of the packet based on the credits requested for routing the packet to the egress port 125. Is this way, the pipeline scheduler 145 performs a check based on the port buffer status indicator 1705 of the egress port 125 to determine whether the egress port 125 is able to accept the packet. If the pipeline scheduler 145 determines that the egress port 125 has sufficient credits for accepting the packet and the buffer in the egress port 125 has available storage capacity for storing the packet, the pipeline scheduler 145 determines that the egress port 125 can accept the packet. Otherwise, the pipeline scheduler 145 determines that the egress port 125 cannot accept the packet. In various embodiments, the port buffer status indicators 1705 and the port buffer state 1700 are optional.

FIG. 18 illustrates a port availability state 1800, in accordance with and embodiment of the present invention. The port availability state 1800 includes port availability indicators 1805 corresponding to the egress ports 125. The port availability indicator 1805 corresponding to an egress port 125 indicates whether the egress port 125 is able to accept a packet (e.g., a maximum sized packet). In various embodiments, the pipeline scheduler 145 generates the port availability indicator 1805 based on the port busy indicator 1405 of the egress port 125, the port buffer status indicator 1705 of the egress port 125, and the available credit indicator 1200 of the egress port 125. Moreover, the pipeline scheduler 145 generates the port availability state 1800 by generating the port availability indicators 1805 of the egress ports 125 and stores the port availability state 1800 by storing the port availability indicators 1805 of the egress ports 125. In turn, the pipeline scheduler 145 generates packet grants 700 based on the packet request state 600 and the port availability state 1800.

Figure 19:
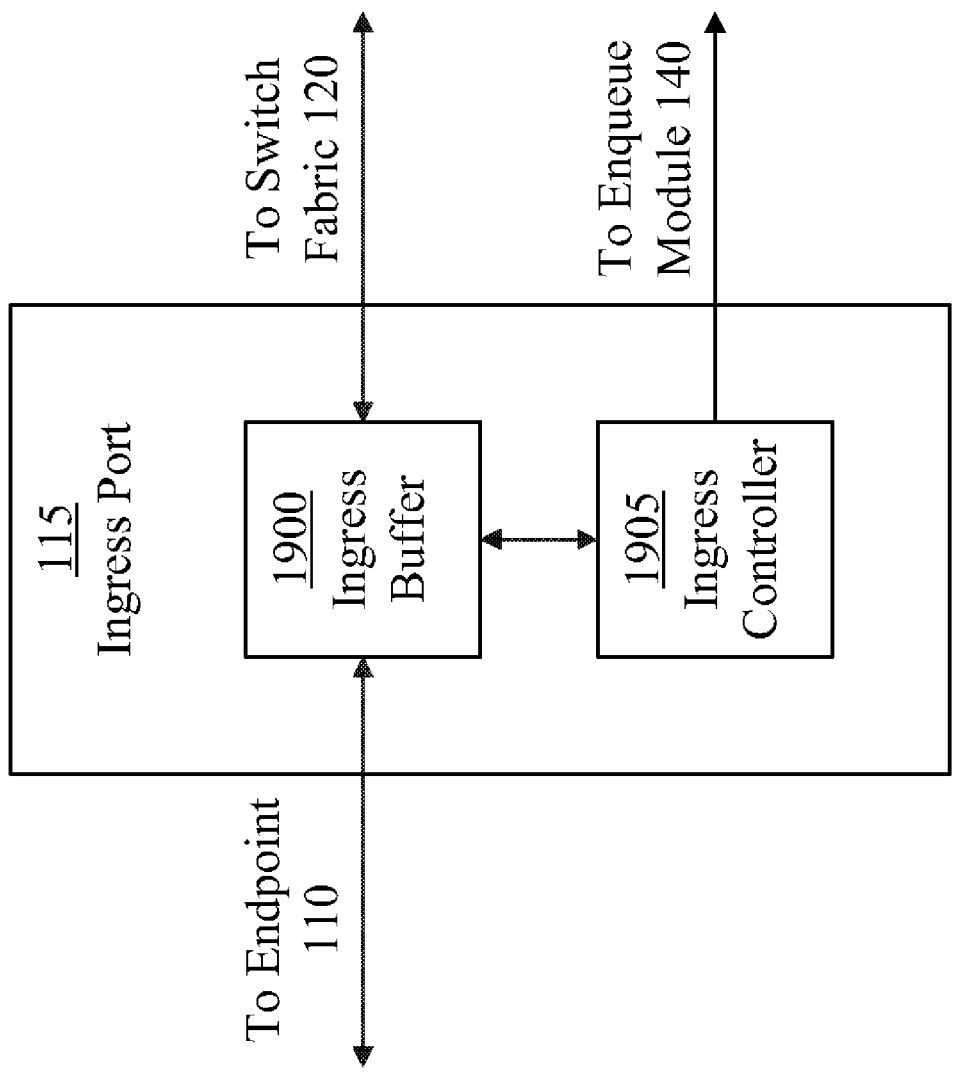
FIG. 19 is a block diagram of an ingress port, in accordance with an embodiment of the present invention.

FIG. 19 illustrates the ingress port 115, in accordance with an embodiment of the present invention. The ingress port 115 includes an ingress buffer 1900 and an ingress controller 1905 coupled (e.g., connected) to the ingress buffer 1900. The ingress buffer 1900 stores packets received by the ingress port 115, for example packets received from the link partner 110 corresponding to the ingress port 115. The ingress controller 1905 generates an enqueue request 200 for each of the packets stored in the ingress port 115 based on the packets and a set of ordering rules for routing the packets. Further, the ingress controller 1905 provides (e.g., transmits) the enqueue request 200 to the enqueue module 140 corresponding to the ingress port 115. In various embodiments, the ingress controller 1905 receives the packets in an ordered sequence and provides the corresponding enqueue requests 200 to the corresponding enqueue module 140 in the same ordered sequence. In this way, the ordered sequence of enqueue requests 200 identifies the ordered sequence of the packets received by the ingress port 115.

Figure 20:
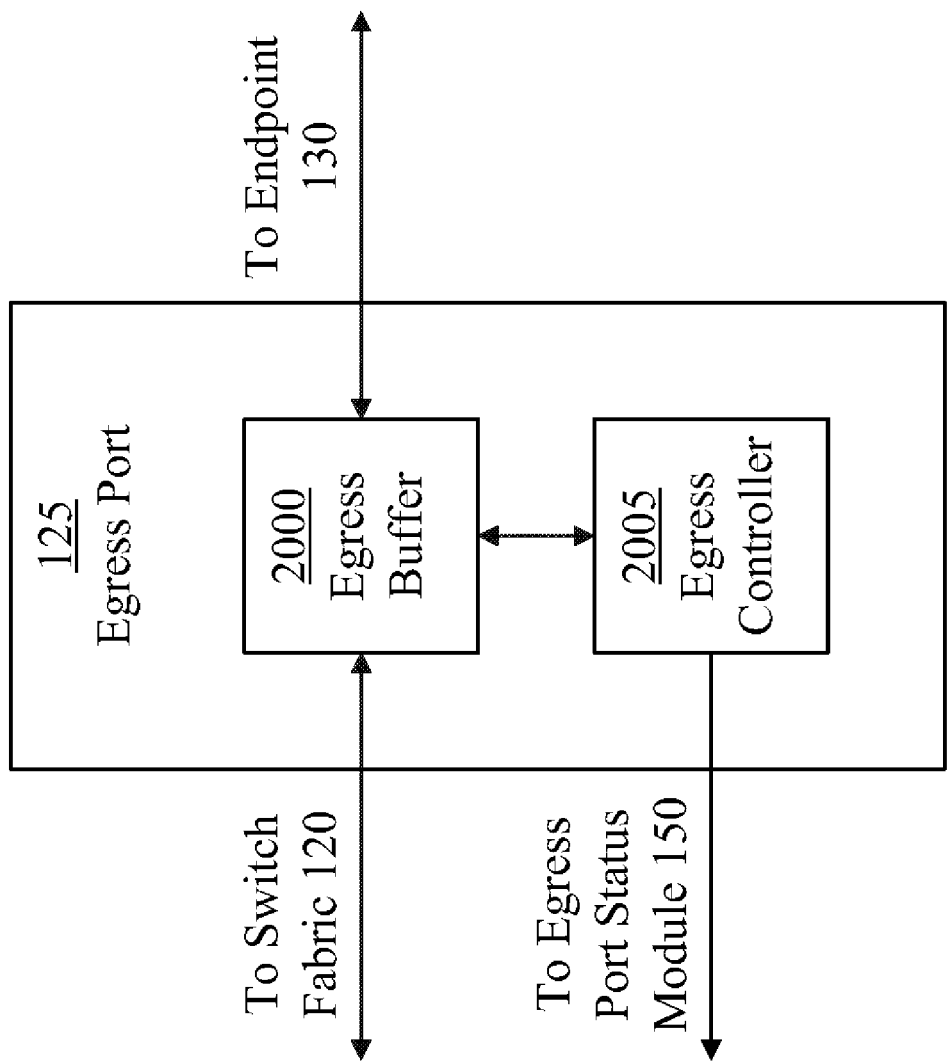
FIG. 20 is a block diagram of an egress port, in accordance with an embodiment of the present invention.

FIG. 20 illustrates the egress port 125, in accordance with an embodiment of the present invention. The egress port 125 includes an egress buffer 2000 and an egress controller 2005 coupled (e.g., connected) to the egress buffer 2000. The egress buffer 2000 stores packets received by the egress port 125, for example packets received from an ingress port 115 through the switch fabric 120. The egress controller 2005 updates the advertised credit indicator 1000 of the egress port 125 to indicate credits consumed by the packets routed to the egress port 125 and stored in the egress buffer 2000. Additionally, the egress port 125 outputs the packets from the packet switch 105 and updates the advertised credit indicator 1000 of the egress port 125 to indicate credits released by outputting the packets from the packet switch 105.

Figure 21:
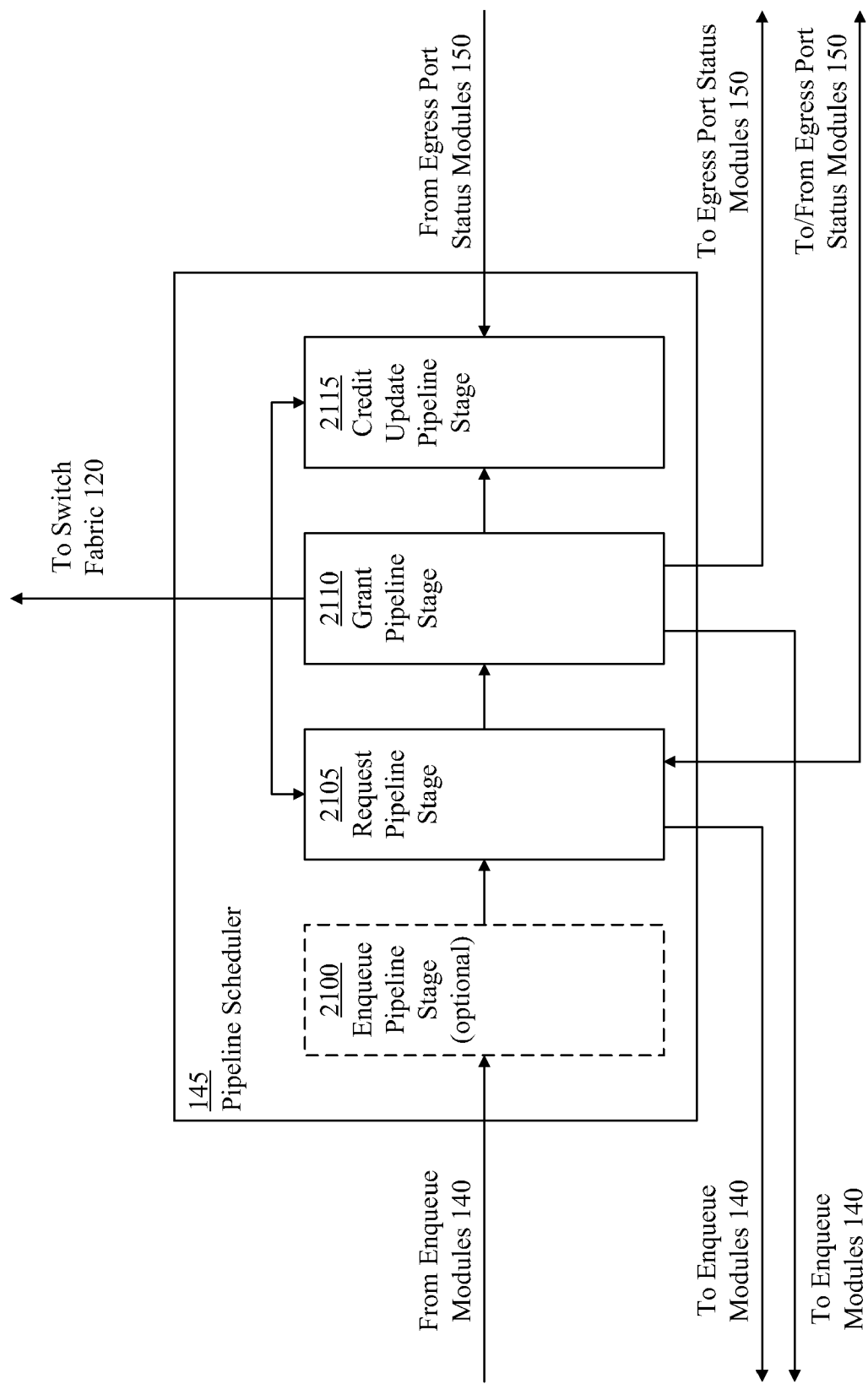
FIG. 21 is a block diagram of a pipeline scheduler, in accordance with an embodiment of the present invention.

FIG. 21 illustrates the pipeline scheduler 145, in accordance with an embodiment of the present invention. The pipeline scheduler 145 includes a request pipeline stage 2105, a grant pipeline stage 2110, and a credit update pipeline stage 2115. The request pipeline stage 2105 selects enqueue requests 200 corresponding to packets stored in the ingress ports 115 based on the enqueue requests 200 and the available credit indicators 1200 of the egress ports 125 identified in the packets. In this way, the request pipeline stage 2105 selects the packets corresponding to the selected enqueue requests 200. Additionally, the request pipeline stage 2105 generates a packet request 500 for each selected enqueue request 200 based on the enqueue request 200 and stores the packet request 500. In this way, the request pipeline stage 2105 may generate a packet request 500 for one or more packets stored in the ingress ports 115, each of which is stored in a different ingress port 115.

In one embodiment, the request pipeline stage 2105 generates a packet request 500 based on an enqueue request 200 by storing an enqueue request identifier 505 identifying the enqueue request 200, storing the destination port indicator 215 of the enqueue request 200 as the port request indicator 510 of the packet request 500, and storing the credit request 220 of the enqueue request 200 as the credit request indicator 515 of the packet request 500. In various embodiments, the request pipeline stage 2105 selects enqueue requests 200 based on the enqueue states 400 corresponding to the ingress ports 115, generates a packet request state 600 based on the selected enqueue requests 200, and stores the packet request state 600 in a request cycle of the pipeline scheduler 145.

In various embodiments, the request pipeline stage 2105 selects an enqueue request 200 for each enqueue module 140 storing at least one active enqueue request 200 in a request cycle of the pipeline scheduler 145. In these embodiments, an enqueue module 140 indicates the enqueue request 200 is active when the enqueue module 140 receives and stores the enqueue request 200. For example, the enqueue module 140 may set a flag corresponding to the enqueue request 200 to indicate the enqueue request 200 is active. Additionally, the enqueue module 140 indicates the enqueue request 200 is inactive when the request pipeline stage 2105 generates a packet request 500 corresponding to the enqueue request 200. For example, the enqueue module 140 may identify the selected enqueue request 200 based on the packet request 500 and set the status flag corresponding to the enqueue request 200 to indicate the enqueue request 200 is inactive. Moreover, if the status flag corresponding to the enqueue request 200 indicates at a start of a request cycle that the enqueue request 200 is inactive, the request pipeline stage 2105 does not select the packet corresponding to the enqueue request 200 in the request cycle.

In various embodiments, an enqueue module 140 deactivates an enqueue request 200 in a request cycle (i.e., a first request cycle) so that the request pipeline stage 2105 does not select the packet in the next request cycle (i.e., a second request cycle). The enqueue module 140 then activates the enqueue request 200 in the request cycle (i.e., a third request cycle) immediately following this next request cycle (i.e., the second request cycle). In this way, the enqueue module 140 generates a skip cycle (i.e., the second request cycle) in which the request pipeline stage 2105 does not generate a packet request 500 for the enqueue request 200.

If the selected packet that is being processed in the pipeline scheduler 145 is not routed to each destination egress port 125 of the packet, the enqueue module 140 updates the enqueue request 200 of the packet so that the enqueue request 200 indicates each destination egress port 125 of the packet to which the packet has not been routed (i.e., each remaining destination egress port 125 of the packet). Additionally, the enqueue module 140 activates (i.e., reactivates) the enqueue request 200 of the packet and the request pipeline stage 2105 generates another packet request 500 for the packet in a subsequent request cycle. For example, if pipeline scheduler 145 does not generate a packet grant 700 for the packet based on the packet request 500 of the packet, the enqueue module 140 updates the enqueue request 200 by activating the enqueue request 200 in the subsequent request cycle (e.g., the next request cycle).

Otherwise, if the selected packet that is being processed in the pipeline scheduler 145 is routed to each destination egress port 125 of the packet, the enqueue module 140 removes (e.g., deletes) the enqueue request 200 of the packet from the enqueue module 140 and the ingress port 115 storing the packet removes (e.g., deletes) the packet from the ingress port 115. In this way, the enqueue module 140 removes the enqueue request 200 from the enqueue state 400 of the ingress port 115 storing the packet and the ingress port 115 removes the packet from the ingress port 115.

In some embodiments, the request pipeline stage 2105 receives an enqueue request 200 generated by an ingress port 115 when the enqueue state 400 of the ingress port 115 does not include any enqueue request 200 (i.e., the enqueue state 400 is empty). In these embodiments, the request pipeline stage 2105 determines that the enqueue state 400 of the ingress port 115 is empty and generates a packet request 500 based on the enqueue request 200. In this way, the request pipeline stage 2105 bypasses the enqueue state 400 of the ingress port 115 stored in the enqueue module 140. Further in these embodiments, the enqueue module 140 updates the enqueue state 400 of the ingress port 115 to include the enqueue request 200 and indicates the enqueue request 200 is inactive based on the packet request 500 generated by the request pipeline stage 2105. For example, the enqueue module 140 may indicate the enqueue request 200 is inactive by setting the status flag corresponding to the enqueue request 200 to indicate the enqueue request 200 is inactive.

In various embodiments, the enqueue modules 140 determines whether a packet being processed in the pipeline scheduler 145 is routed to each destination egress port 125 of the packet based on one or more port grants 710 corresponding to the packet. For example, an enqueue module 140 may update the destination port indicator 215 in the enqueue request 200 of a packet based on a port grant 710 of the packet to indicate the packet has been routed to each egress port 125 identified in the port grant 710. Furthermore, if the packet is a multicast packet identifying multiple destination egress ports 125, the enqueue module 140 may update the destination port indicator 215 in the enqueue request 200 of the packet based on multiple port grants 710 generated in multiple scheduling cycles until the multicast packet is routed to each destination egress port 125 of the multicast packet.

In various embodiments, the request pipeline stage 2105 selects the enqueue request 200 stored in an enqueue module 140 corresponding to an ingress port 115 that identifies the oldest unblocked routable packet stored in the ingress port 115. In these embodiments, the request pipeline stage 2105 selects the enqueue requests 200 based on the enqueue requests 200 stored in the enqueue module 140 (e.g., an enqueue state 400) and a set of ordering rules for determining an order for routing packets from an ingress port 115 to the egress ports 125. The set of ordering rules indicates that the packets are to be routed from the ingress port 115 to the egress ports 125 in the same sequential order in which the ingress port 115 received the packets but may otherwise be reordered if the oldest routable packet stored in the ingress port 115 is blocked in the ingress port 115. For example, a packet may be blocked in an ingress port 115 if each destination egress port 125 of the packet is busy.

In various embodiments, the set of ordering rules include requisite passing rules, prohibitive passing rules, and permissive passing rules. The requisite passing rules indicate whether a subsequent packet received at an ingress port 115 is required to pass a previous packet received at the ingress port 115 if the previous packet is blocked in the ingress port 115, based on the packet types of the previous packet and subsequent packet. The prohibitive passing rules indicate whether a subsequent packet received at the ingress port 115 is prohibited from passing a previous packet received at the ingress port 115, based on the packet types of the previous packet and subsequent packet. The permissive passing rules indicate whether a subsequent packet received at the ingress port 115 is permitted to pass a subsequent packet received at the ingress port 115, based on the packet types of the previous packet and subsequent packet. Moreover, the set of ordering rules indicate when a subsequent packet received at an ingress port 115 is required, prohibited, or permitted to be routed ahead of a previous packet received at the ingress port 115. In this way, the set of ordering rules indicate when the subsequent packet is required, prohibited, or permitted to pass the previous packet in the sequential order of the packets.

In various embodiments, the request pipeline stage 2105 generates a packet request 500 for the oldest unblocked routable packet, if any, stored in each ingress port 115. Because the grant pipeline stage 2110 selects packets based on the packet requests 500 generated by the request pipeline stage 2105, the grant pipeline stage 2110 schedules the oldest unblocked routable packet stored in each ingress port 115 for routing to the egress ports 125 in these embodiments.

In these embodiments, the request pipeline stage 2105 of the pipeline scheduler 145 determines whether a packet stored in an ingress port 115 is routable based on the enqueue state 400 of the ingress port 115 and the set of ordering rules implemented by the packet switch 105. In one embodiment, the request pipeline stage 2105 identifies each routable packet stored in the ingress port 115 by identifying the oldest packet stored in the ingress port 115 as a routable packet based on the oldest enqueue request 200 in the enqueue state 400. Additionally, the request pipeline stage 2105 identifies any newer packet (i.e., subsequent packet) stored in the ingress port 115 as a routable packet if the packet is permitted or required to pass each older packet (i.e., previous packet) stored in the ingress port 115 and is not prohibited from passing each older packet stored in the ingress port 115, based on the set of ordering rules.

Additionally, the request pipeline stage 2105 determines whether each routable packet is blocked based on the enqueue request 200 of the routable packet and the port busy indicator 1405 of each egress port 125 identified as a destination egress port 125 for the routable packet in the enqueue request 200. If the port busy indicator 1405 of at least one egress port 125 identified as a destination egress port 125 for the routable packet in the enqueue request 200 indicates the egress port 125 will not be busy in the routing cycle corresponding to the scheduling cycle (e.g., the next clock cycle following the scheduling cycle), the request pipeline stage 2105 of the pipeline scheduler 145 determines the routable packet is an unblocked routable packet. In various embodiments, the request pipeline stage 2105 of the pipeline scheduler 145 selects the oldest unblocked routable packet stored in the ingress port 115 and generates a packet request 500 corresponding to the ingress port 115 based on the enqueue request 200 of the oldest unblocked routable packet stored in the ingress port 115.

The grant pipeline stage 2110 selects packets for routing to the egress ports 125 by selecting packet requests 500 generated by the request pipeline stage 2105 that correspond to the packets. Additionally, the grant pipeline stage 2110 generates packet grants 700 based on the selected packet requests 500. In this way, the grant pipeline stage 2110 selects packets corresponding to the selected packet requests 500 for routing to the egress ports 125. Additionally, the grant pipeline stage 2110 stores port grants 710 based on the packet grants 700 generated by the grant pipeline stage 2110. In various embodiments, the grant pipeline stage 2110 generates packet grants 700 in a scheduling cycle and stores port grants 710 corresponding to the packet grants 700 in the scheduling cycle.

In various embodiments, the grant pipeline stage 2110 selects packets for routing to the egress ports 125 by selecting the packet requests 500 corresponding to the packets based on a scheduling algorithm. For example, the scheduling algorithm may be a round robin scheduling algorithm or a weighted round robin scheduling algorithm. If more than one of the packet requests 500 identifies the same egress port 125 as a destination egress port 125 for the packets corresponding to the packet request 500, the grant pipeline stage 2110 selects one of the packets based on the scheduling algorithm. Moreover, the grant pipeline stage 2110 selects the packets so that the switch fabric 120 may route the selected packets in parallel (e.g., substantially simultaneously) from the ingress ports 115 to the egress ports 125.

In various embodiments, the credit update pipeline stage 2115 initializes the available credit indicators 1200 of the egress ports 125 based on the advertised credit indicators 1000 of the egress ports 125. For example, the credit update pipeline stage 2115 may initialize the available credit indicator 1200 of an egress port 125 by setting the available credit indicator 1200 to the advertised credit indicator 1000 of the egress port 125. Additionally, the credit update pipeline stage 2115 stores the available credit indicators 1200, for example by storing an available credit state 1300 including the available credit indicators 1200.

In some embodiments, the credit update pipeline stage 2115 predecrements the available credit indicator 1200 of an egress port 125 based on packet requests 500 generated by the request pipeline stage 2105 in a clock cycle (e.g., a request cycle) to indicate a minimum number of credits to be consumed for routing one of the packets to the egress port 125 in a subsequent clock cycle (e.g., a routing cycle). The credit update pipeline stage 2115 then selects one of those packets and adjusts the available credit indicator 1200 of the egress port 125 in the subsequent cycle based on a port grant 710 of the selected packet to indicate credits requested and to be consumed for routing the packet to the egress port 125, as is described more fully herein. In this way, the credit update pipeline stage 2115 updates the available credit indicator 1200 of the egress port 125 based on the packet requests 500 generated by the request pipeline stage 2105 and updates the available credit indicator 1200 of the egress port 125 based on the port grant 710 generated by the grant pipeline stage 2110.

In various embodiments, the grant pipeline stage 2110 of the pipeline scheduler 145 selects packets in a scheduling cycle and the switch fabric 120 routes the selected packets in a routing cycle following the scheduling cycle. In these embodiments, the credit update pipeline stage 2115 of the pipeline scheduler 145 updates the available credit indicators 1200 for the selected packets in a credit update cycle that follows the scheduling cycle. For example, the credit update cycle may be the same as the routing cycle following the scheduling cycle. In some embodiments, the pipeline scheduler 145 routes the selected packets in more than one subsequent routing cycle following the scheduling cycle and the credit update pipeline stage 2115 updates the available credit indicators 1200 for the selected packets in more than one subsequent credit update cycles following the scheduling cycle.

In some embodiments, the request pipeline stage 2105 generates a packet request state 600 including packet requests 500 for packets stored in corresponding ingress ports 115 based on enqueue requests 200 generated for the packets by the ingress ports 115. Additionally, the credit update pipeline stage 2115 generates an available credit state 1300 including available credit indicators 1200 generated by the egress ports 125. In turn, the grant pipeline stage 2110 generates a port grant state 900 including port grants 710 based on the packet request state 600 and the available credit state 1300. Additionally, the switch fabric 120 routes packets from the ingress ports 115 to the egress ports 125 based on the port grants 710 and the credit update pipeline stage 2115 updates the available credit state 1300 based on the port grants 710.

In some embodiments, the request pipeline stage 2105 generates packet requests 500 based on the enqueue states 400 of the ingress ports 115, the available credit state 1300, and the port busy state 1400. In these embodiments, the request pipeline stage 2105 generates packet requests 500 in a request cycle, each of which identifies a same egress port 125 as a destination egress port 125 for the packets corresponding to the packet requests 500. Additionally, the request pipeline stage 2105 determines a minimum packet length among the packets based on the credits requested for the packets in the packet requests 500. For example, the minimum packet length may indicate a minimum number of credits requested for routing a packet to the egress port 125. Moreover, the minimum packet length indicates a minimum number of clock cycles (m) for routing one of the packets to the egress port 125. For example, the minimum packet length may be the same as the minimum number of clock cycles.

Further in this embodiment, the egress port status module 150 corresponding to the egress port 125 updates the port busy indicator 1405 of the egress port 125 in the scheduling cycle following the request cycle to indicate that the egress port 125 will be busy for an additional number of clock cycles equal to the minimum number of clock cycles. Moreover, the grant pipeline stage 2110 determines the packet length of the selected packet and updates the port busy indicator 1405 in a routing cycle following the scheduling cycle based on the packet length of the selected packet to indicate the number of clock cycles (n) in which the egress port 125 will be busy receiving the selected packet.

For example, the port busy indicator 1405 of the egress port 125 may be a port busy count indicating a number of clock cycles in which the egress port 125 will be busy. In this example, the egress port status module 150 increments the port busy indicator 1405 of the egress port 125 in a scheduling cycle by the minimum number of cycles. Further in this example, the egress port status module 150 increments the port busy indicator 1405 of the egress port 125 in a routing cycle by a number of clock cycles (n−m) equal to the difference between the number of clock cycles (n) determined for routing the packet to the egress port 125 and the minimum number of cycles (m).

In one embodiment, the egress port status module 150 increments the port busy indicator 1405 of the egress port 125 in a scheduling cycle by one less than the minimum number of cycles (m−1). As a result, the port busy indicator 1405 of the egress port 125 indicates the egress port 125 will not be busy one clock cycle before the egress port 125 will not be busy. In this way, the egress port status module 150 accounts for a one clock cycle difference between the request cycle and the scheduling cycle in which the grant pipeline stage 2110 generates a port grant 710 based on a packet request 500.

Further in this embodiment, the egress port status module 150 increments the port busy indicator 1405 of the egress port 125 in a routing cycle by one less than a number of clock cycles equal to the difference between the number of clock cycles determined for routing the packet to the egress port 125 and the minimum number of cycles (n−m−1). In this way, the egress port status module 150 increments the port busy indictor 1405 of the egress port 125 in both the scheduling cycle and the routing cycle so that the port busy indicator 1405 is decremented by two less than the number of clock cycles accounts (i.e., (m−1)+(n−m−1)=n−2). As a result, the port busy indicator 1405 of the egress port 125 indicates the egress port 125 is no longer busy two clock cycles before the egress port 125 is not busy. In this way, the egress port status module 150 accounts for a difference of two clock cycles between the request cycle and the routing cycle.

The egress port status module 150 accounts for a difference of two clock clocks between the request cycle and the routing cycle in this embodiment because the switch fabric 120 begins to route a packet in a routing cycle that occurs two clock cycles after the request pipeline stage 2105 generates a packet request 500 for the packet in a routing cycle. As a result, the request pipeline stage 2105 may generate a packet request 500 identifying the egress port 125 when the port busy indicator 1405 of the egress port 125 indicates the egress port 125 is not busy and the egress port 125 will no longer be busy two cycles later when the switch fabric 120 begins to route this other packet to the egress port 125. In other embodiments, the egress port status module 150 may account for a difference of more or fewer than two clock cycles between the request cycle, in which the request pipeline stage 2105 generates a packet request 500 for a packet, and the routing cycle, in which the switch fabric 120 begins to route the packet to an egress port 125.

In some embodiments, the credit update pipeline stage 2115 generates a port buffer state 1700 including port buffer status indicators 1705 generated by the egress ports 125. In these embodiments, the request pipeline stage 2105 generates the packet request state 600 based on the available credit state 1300 and the port buffer state 1700. In this process, the request pipeline stage 2105 determines whether an egress port 125 has sufficient credits for accepting a packet based on the available credit state 1300 and determines whether the egress buffer 2000 in the egress port 125 has available storage capacity for storing the packet based on the port buffer state 1700. In this way, the packet request pipeline stage 2105 performs a check based on the port buffer state 1700 to determine whether the egress buffer 2000 in the egress port 125 is able to accept the packet.

In further embodiments, the pipeline scheduler 145 includes an optional enqueue pipeline stage 2100 coupled (e.g., connected) to the request pipeline stage 2105. The enqueue pipeline stage 2100 generates an enqueue state 400 for each ingress port 115 including the enqueue requests 200 generated by the ingress port 115 and stored in the corresponding enqueue module 140. For example, the enqueue pipeline stage 2100 may include a portion of the enqueue module 140 that stores the enqueue requests 200 in the enqueue state 400. Moreover, the enqueue state 400 indicates the sequential order of the enqueue requests 200 stored in the enqueue module 140. In this further embodiment, the request pipeline stage 2105 generates the packet request state 600 based on the enqueue states 400 of the ingress ports 115.

In some embodiments, the grant pipeline stage 2110 generates packet grants 700 based on both the packet requests 500 generated by the request pipeline stage 2105 and the port availability indicators 1805 generated by the credit update pipeline stage 2115. In one embodiment, the port availability indicator 1805 indicates an egress port 125 is available to accept a maximum sized packet if the port busy indicator 1405 of the egress port 125 indicates the egress port 125 is not busy, the port buffer status indicator 1705 of the egress port 125 indicates the egress buffer 2000 of the egress port 125 has available storage capacity for storing a maximum sized packet, and the available credit indicator 1200 of the egress port 125 indicates the egress port 125 has sufficient credits for accepting a maximum sized packet. In this way, the port availability indicator 1805 indicates whether the egress port 125 is able to accept a maximum sized packet. In this embodiment, the grant pipeline stage 2110 does not generate a packet grant 700 for a packet if a destination egress port 125 identified in a packet request 500 of the packet does not have credits available for accepting a maximum sized packet. In this way, the grant pipeline stage 2110 performs a check based on the port availability indicator 1805 of the egress port 125 to determine whether the egress port 125 is able to accept the packet.

Figure 22:
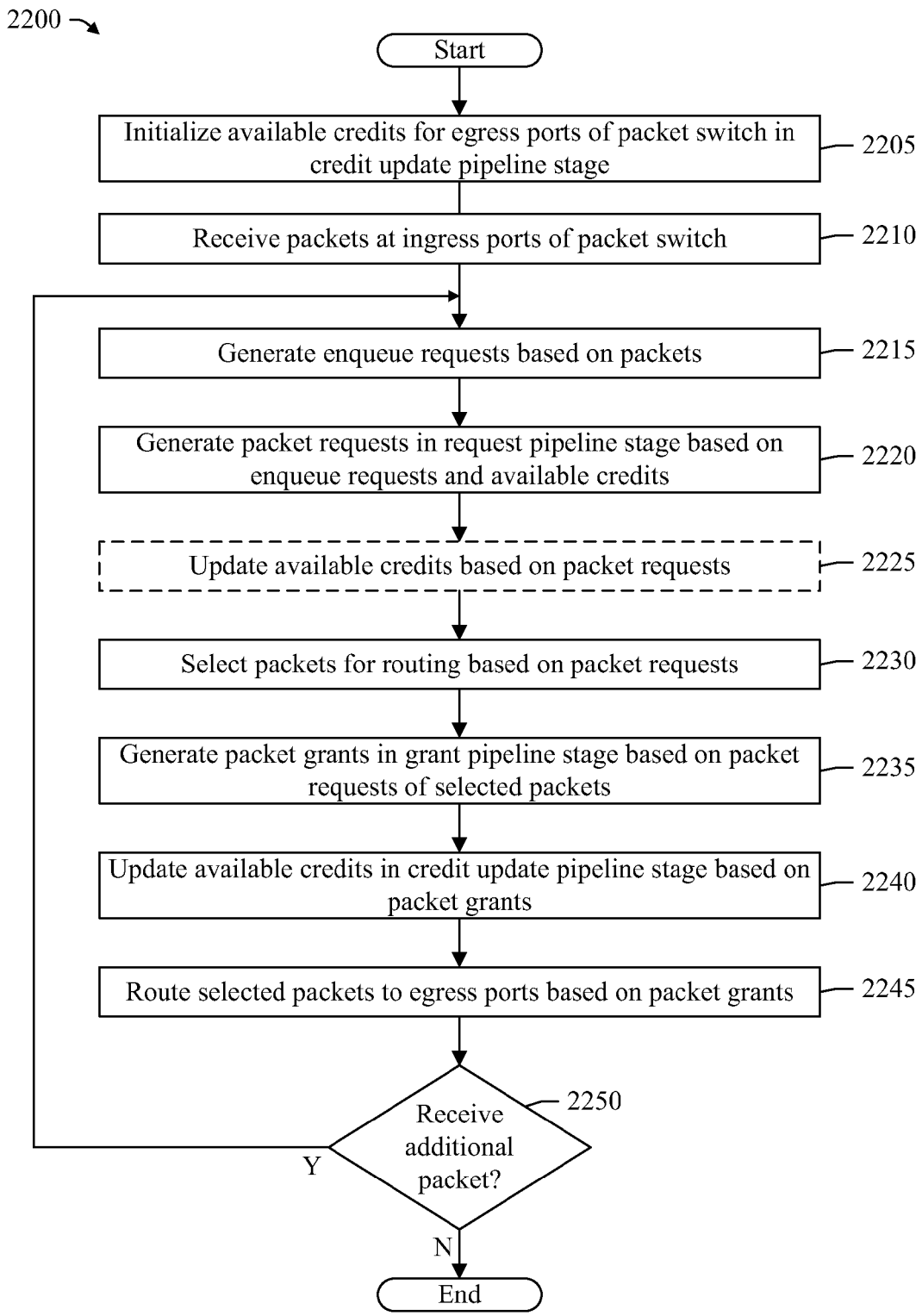
FIG. 22 is a flow chart of a method of routing packets through a packet switch, in accordance with an embodiment of the present invention.

FIG. 22 illustrates a method 2200 of routing packets through a packet switch, in accordance with an embodiment of the present invention. In step 2205, available credits are initialized for egress ports of the packet switch in a credit update pipeline stage. In various embodiments, the packet switch 105 initializes available credits for egress ports 125 of the packet switch 105 in the credit update pipeline stage 2115 by setting the available credit indicators 1200 corresponding to the egress ports 125 to the advertised credit indicators 1000 corresponding to the egress port 125. For example, the credit update pipeline stage 2115 of the pipeline scheduler 145 may set the available credit indicator 1200 of an egress port 125 to the advertised credit indicator 1000 of the egress port 125 upon power up or reset of the packet switch 105. In various embodiments, the credit update pipeline stage 2115 generates the available credit indicators 1200 of the egress ports 125 by generating an available credit state 1300 including the available credit indicators 1200. The method 2200 then proceeds to step 2210.

In step 2210, packets are received at ingress ports of the packet switch. In various embodiments, the ingress ports 115 receive packets, for example from link partners 110 corresponding to the ingress port 115. Moreover, each of the ingress ports 115 receiving a packet stores the packet in the ingress port 115, for example in an ingress buffer 1900 of the ingress port 115. The method 2200 then proceeds to step 2215.

In step 2215, enqueue requests are generated based on the packets received at the ingress ports of the packet switch. In various embodiments, the ingress ports 115 generate enqueue requests 200 for the packets stored in the ingress ports 115. In this process, each ingress port 115 receiving a packet and storing the packet in the ingress port 115 generates an enqueue request 200 for the packet based on data in the packet. For example, an ingress port 115 may generate an enqueue request 200 for a packet based on a packet header of the packet. Moreover, the enqueue request 200 for the packet identifies the packet. For example, the enqueue request 200 may identify a storage location in the ingress port 115 storing the packet.

Furthermore, each of the ingress ports 115 generating an enqueue request 200 provides the enqueue request 200 to the enqueue module 140 corresponding to the ingress port 115. In turn, the enqueue module 140 stores the enqueue request 200 and generates an enqueue state 400 for the corresponding ingress port 115 based on each enqueue request 200 stored in the enqueue module 140. For example, the enqueue module 140 may generate the enqueue state 400 by storing enqueue requests 200 received from the corresponding ingress port 115, as is described more fully herein. The method 2200 then proceeds to step 2220.

In step 2220, packet requests are generated in a request pipeline stage based on the enqueue requests and the available credits. In various embodiments, the request pipeline stage 2105 of the pipeline scheduler 145 generates packet requests 500 based on the enqueue requests 200 and available credit indicators 1200 of the egress ports 125 identified as destination egress ports 125 in the enqueue requests 200. For example, an enqueue module 140 may generate a packet request 500 for a packet based on the enqueue state 400 of the ingress port 115 storing the packet and an available credit state 1300 including the available credit indicators 1200 of the egress ports 125, as is described more fully herein. Additionally, the request pipeline stage 2105 stores the packet request 500, for example by storing a packet request state 600 including the packet request 500.

In embodiments including the enqueue pipeline stage 2100, the enqueue pipeline stage 2100 generates enqueue states 400 based on the enqueue requests 200 generated by the ingress ports 115. In these embodiments, the request pipeline stage 2105 generates the packet request state 600 based on the enqueue states 400 generated by the enqueue pipeline stage 2100. The method 2200 then proceeds to step 2225.

In optional step 2225, the available credits are updated based on the packet requests. In various embodiments, the credit update pipeline stage 2115 updates the available credits of the egress ports 125 based on the packet requests 500 generated by the request pipeline stage 2105. For example, the credit update pipeline stage 2115 may update the available credit indicators 1200 of the egress ports 125 based on the packet request state 600 by updating the available credit state 1300, as is described more fully herein. The method 2200 then proceeds to step 2230.

In step 2230, packets are selected for routing based on the packet requests. In various embodiments, the pipeline scheduler 145 selects packets for routing to egress ports 125 of the packet switch 105 based on the packet requests 500 generated by the request pipeline stage 2105 of the pipeline scheduler 145. For example, the grant pipeline stage 2110 may select the packets based on the packet request state 600 generated by the request pipeline stage 2105 and a scheduling algorithm (e.g., a round robin scheduling algorithm), as is described more fully herein. The method 2200 then proceeds to step 2235.

In step 2235, packet grants are generated in a grant pipeline stage based on the packet requests of the selected packets. In various embodiments, the grant pipeline stage 2110 generates packet grants 700 based on the packet requests 500 generated for the selected packets in the request pipeline stage 2105. In some embodiments, the grant pipeline stage 2110 generates the packet grants 700 based on a packet request state 600 including the packet requests 500 of the selected packets. In various embodiments, the grant pipeline stage 2110 generates the packet grants 700 based on the packet request state 600 and the available credit state 1300, as is described more fully herein. In some embodiments, the grant pipeline stage 2110 generates the packet grants 700 based on the packet request state 600, the available credit state 1300, and the port buffer state 1700, as is described more fully herein. In some embodiments, the grant pipeline stage 2110 generates the packet grants 700 based on the packet request state 600 and the port availability state 1800, as is described more fully herein. The method 2200 then proceeds to step 2240.

In step 2240, the available credits are updated in the credit update pipeline stage based on the packet grants. In various embodiments, the credit update pipeline stage 2115 updates the available credit indicators 1200 based on the packet grants 700 generated by the grant pipeline stage 2110. In this way, the credit update pipeline stage 2115 updates the available credit indicators 1200 to indicate credits requested and to be consumed for routing the selected packets to egress ports 125 of the packet switch 105. In some embodiments, the credit update pipeline stage 2115 updates the available credit indicators 1200 based on the packet grants 700 to adjust for updates to the available credit indicators 1200 performed by the credit update pipeline stage 2115 based on the packet requests 500 generated by the request pipeline stage 2105, as is described more fully herein. The method 2200 then proceeds to step 2245.

In step 2245, the selected packets are routed to egress ports based on the packet grants. In various embodiments, the packet switch 105 routes the selected packets to egress ports 125 of the packet switch 105 based on the packet grants 700. For example, the switch fabric 120 may route the selected packets to egress ports 125 in parallel (e.g., substantially simultaneously) based on the packet grants 700 of the selected packets, as is described more fully herein. The method 2200 then proceeds to step 2250.

In step 2250, it is determined whether an additional packet is received by the ingress ports. In various embodiments, the packet switch 105 determines whether an additional packet is received at the ingress ports 115. For example, each of the ingress ports 115 may determine whether the ingress port 115 receives a packet from the link partner 110 corresponding to the ingress port 115. If the packet switch 105 determines that an additional packet is received at the ingress ports 115, the method 2200 returns to step 2215, otherwise the method 2200 ends.

In various embodiments, the method 2200 may include more or fewer than the steps 2205-2250 illustrated in FIG. 22 and described above. In some embodiments, the steps 2205-2250 of the method 2200 may be performed in a different order than the order illustrated in FIG. 22 and described above. In some embodiments, some of the steps 2205-2250 of the method 2200 may be performed in parallel or substantially simultaneously. In various embodiments, one or more of the steps 2205-2250 may be performed more than once in the method 2200.

Figure 23:
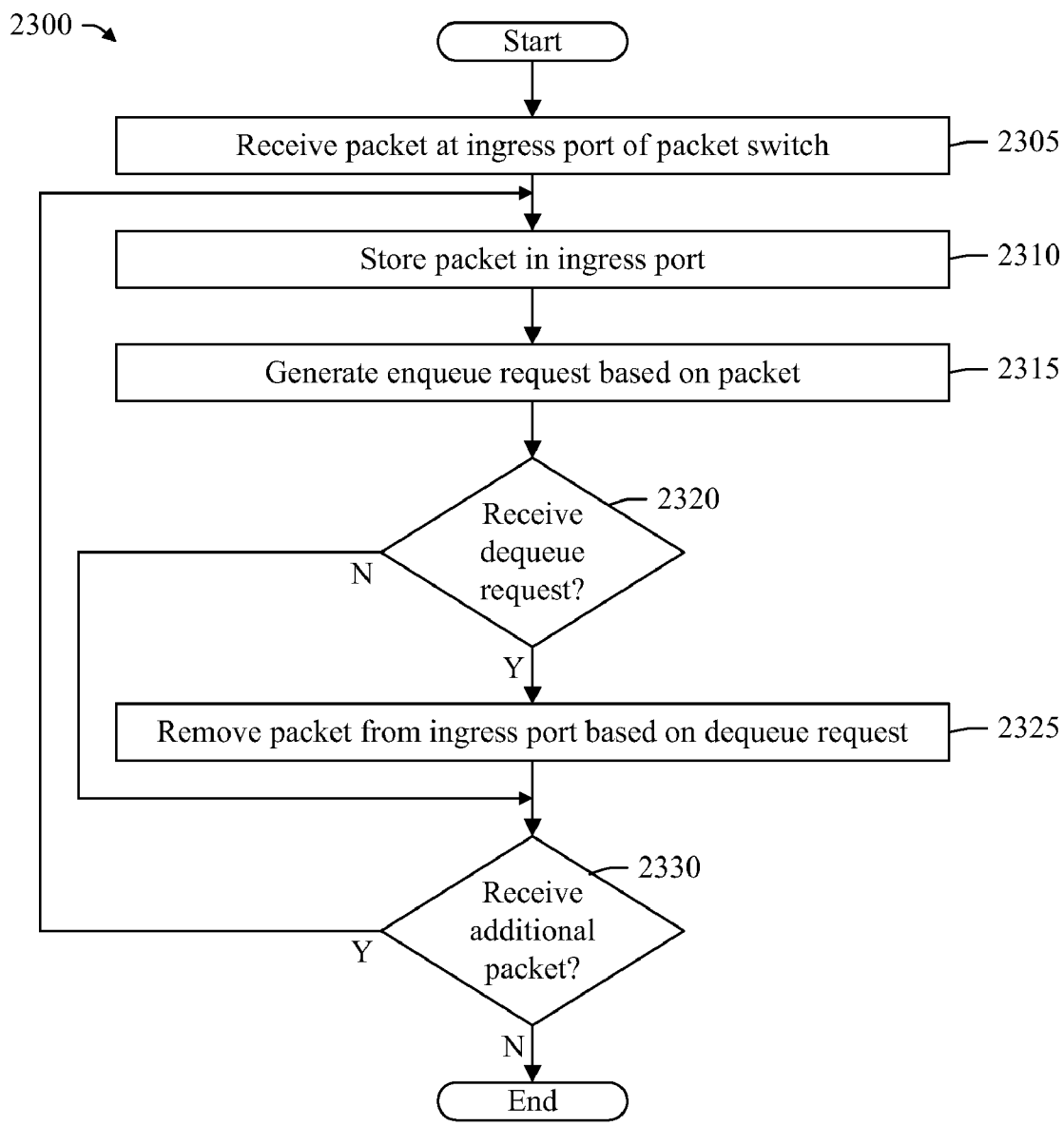
FIG. 23 is a flow chart for a portion of a method of routing packets through a packet switch, in accordance with an embodiment of the present invention.

FIG. 23 illustrates a portion 2300 of the method 2200 of routing packets through a packet switch, in accordance with an embodiment of the present invention. In various embodiments, an ingress port 115 of the packet switch 105 performs the portion 2300 of the method 2200. Moreover, each of the ingress ports 115 may perform the same portion 2300 of the method 2200 in parallel (e.g., substantially simultaneously). In step 2305, a packet is received at an ingress port of the packet switch. In various embodiments, an ingress port 115 receives a packet, for example from the link partner 110 corresponding to the ingress port 115. The method 2200 then proceeds to step 2310.

In step 2310, the packet is stored in the ingress port. In various embodiments, the ingress port 115 receiving the packet stores the packet in the ingress port 115. For example, the ingress controller 1905 of the ingress port 115 may store the packet in the ingress buffer 1900 of the ingress port 115. The method 2200 then proceeds to step 2315.

In step 2315, an enqueue request is generated based on the packet. In various embodiments, the ingress port 115 generates an enqueue request 200 based on the packet received at the ingress port 115. The method 2200 then proceeds to step 2320.

In step 2320, it is determined whether a dequeue request is received by the ingress port. In various embodiments, the ingress port 115 determines whether a dequeue request 1500 is received by the ingress port 115. For example, the ingress controller 1905 of the ingress port 115 may determine whether the ingress port 115 receives a dequeue request 1500 from the enqueue module 140 corresponding to the ingress port 115. If the ingress port 115 determines that a dequeue request 1500 is received at the ingress port 115, the method 2200 proceeds to step 2325. Otherwise, the method 2200 proceeds to step 2330.

In step 2325, arrived at from the determination in step 2325 that a dequeue request is received at the ingress port, a packet is removed from the ingress port based on the dequeue request. In various embodiment, the ingress port 115 removes the packet identified by the dequeue request 1500 from the ingress port 115. For example, the ingress controller 1905 of the ingress port 115 may delete the packet identified by the dequeue request 1500 from the ingress buffer 1900 of the ingress port 115. The method 2200 then proceeds to step 2330.

In step 2330, arrived at from step 2320 in which it is determined that the ingress port did not receive a dequeue request or step 2325 in which a packet is removed from the ingress port based on a dequeue request, it is determined whether an additional packet is received at the ingress port. In various embodiments, the packet switch 105 determines whether an additional packet is received at the ingress port 115. For example, the packet switch 105 may determine whether the ingress port 115 receives a packet from the link partner 110 corresponding to the ingress port 115. If the packet switch 105 determines that an additional packet is received at the ingress port 115, the method 2200 returns to step 2310. Otherwise, the portion 2300 of the method 2200 ends.

In various embodiments, the portion 2300 of the method 2200 may include more or fewer than the steps 2305-2330 illustrated in FIG. 23 and described above. In some embodiments, the steps 2305-2330 of the method 2200 may be performed in a different order than the order illustrated in FIG. 23 and described above. In some embodiments, some of the steps 2305-2330 of the method 2200 may be performed in parallel or substantially simultaneously. In various embodiments, one or more of the steps 2305-2330 may be performed more than once in the method 2200.

Figure 24:
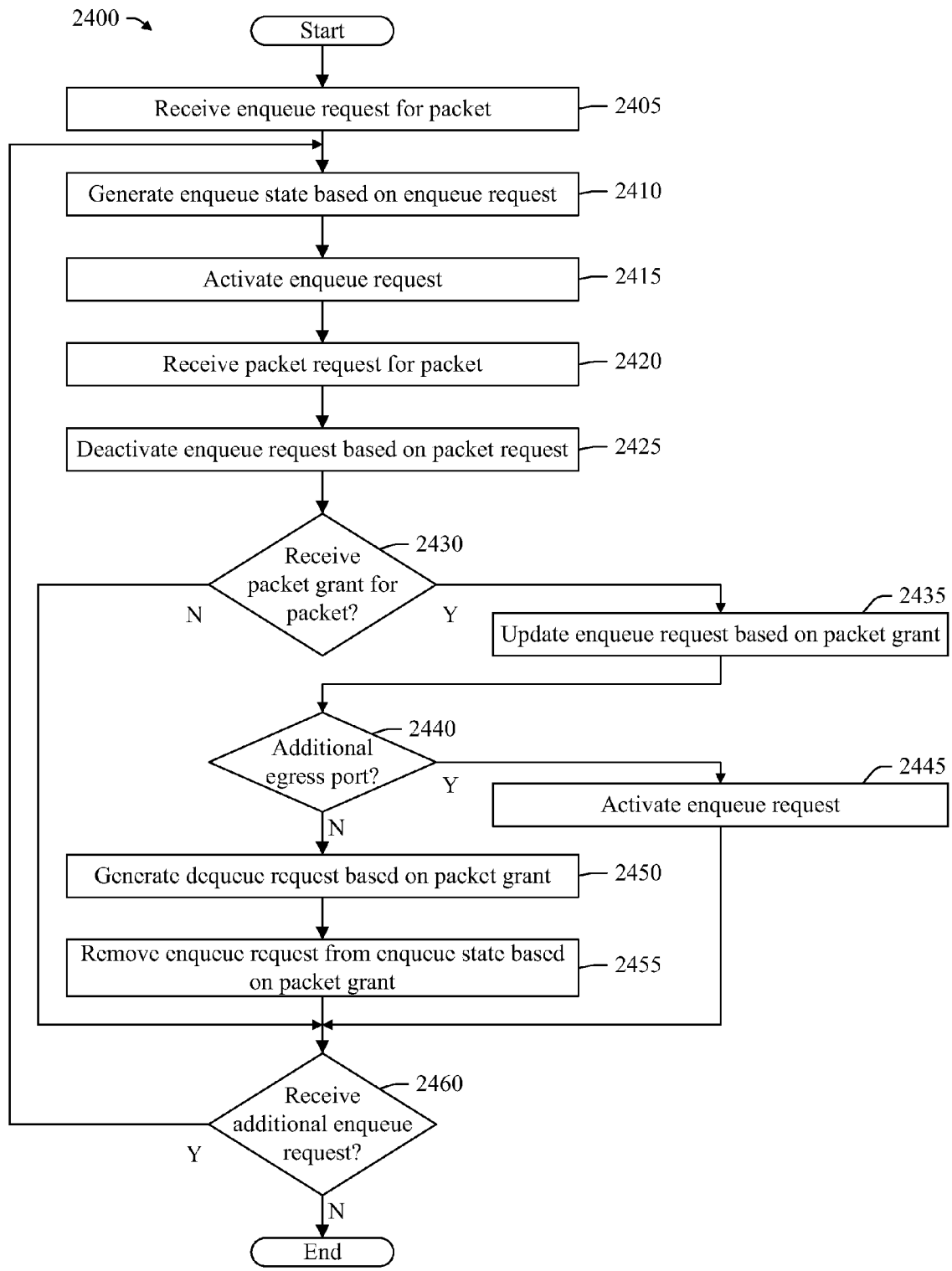
FIG. 24 is a flow chart for a portion of a method of routing packets through a packet switch, in accordance with an embodiment of the present invention.

FIG. 24 illustrates a portion 2400 of the method 2200 of routing packets through a packet switch, in accordance with an embodiment of the present invention. In various embodiments, an enqueue module 140 of the packet switch 105 performs the portion 2400 of the method 2200. Moreover, each of the enqueue modules 140 may perform the same portion 2400 of the method 2200 in parallel (e.g., substantially simultaneously). In step 2405, an enqueue request is received for a packet. In various embodiments, an enqueue module 140 receives an enqueue request 200 for a packet from the ingress port 115 corresponding to the enqueue module 140. Moreover, the enqueue request 200 identifies the packet, as is described more fully herein. For example, the enqueue request 200 may identify a storage location storing the packet in the ingress buffer 1900 of the ingress port 115. The method 2200 then proceeds to step 2410.

In step 2410, an enqueue state is generated based on the enqueue request. In various embodiments, the enqueue module 140 generates an enqueue state 400 based on the enqueue requests 200 received from the corresponding ingress port 115. For example, the enqueue module 140 may generate the enqueue state 400 by storing the enqueue request 200. In this example, the enqueue state 400 includes the enqueue request 200 received from the ingress port 115 and may include other enqueue requests 200 received from the ingress port 115. Moreover, the enqueue state 400 indicates a sequential order in which the enqueue requests 200 in the enqueue state 400 are received from the ingress port 115, as is described more fully herein. The method 2200 then proceeds to step 2415.

In step 2415, the enqueue request is activated. In various embodiments, the enqueue module 140 activates the enqueue request 200. For example, the enqueue module 140 may set a status flag of the enqueue request 200 indicating that the enqueue request 200 is active. Because the enqueue request 200 is active, the request pipeline stage 2105 of the pipeline scheduler 145 may select the packet for processing, as is described more fully herein. The method 2200 then proceeds to step 2420.

In step 2420, a packet request for the packet is received. In various embodiments, the enqueue module 140 receives a packet request 500 for the packet stored in the ingress port 115. The packet request 500 is generated by the pipeline scheduler 145, as is described more fully herein. Moreover, the packet request 500 identifies the enqueue request 200 of the packet stored in the ingress port 115. For example, the enqueue request 200 of the packet may identify a storage location storing the enqueue request 200 in the enqueue module 140. The method 2200 then proceeds to step 2425.

In step 2425, the enqueue request of the packet is deactivated based on the packet request of the packet. In various embodiments, the enqueue module 140 deactivates the enqueue request 200 of the packet based on the packet request 500. For example, the enqueue module 140 may set the status flag of the enqueue request 200 to indicate that the enqueue request 200 is inactive. Because the enqueue request 200 is inactive, the request pipeline stage 2105 of the pipeline scheduler 145 does not select the packet for processing again unless the enqueue request 200 becomes active. In this way, the enqueue module 140 prevents the request pipeline stage 2105 of the pipeline scheduler 145 from selecting the packet for processing when the pipeline scheduler 145 is already processing the packet. The method 2200 then proceeds to step 2430.

In step 2430, it is determined whether a packet grant is received for the packet. In various embodiments, the enqueue module 140 determines whether a packet grant 700 for the packet is received by the enqueue module 140. In various embodiments, the grant pipeline stage 2110 of the pipeline scheduler 145 generates the packet grant 700 based on packet requests 500, as is described more fully herein. If the enqueue module 140 determines that the enqueue module 140 has received a packet grant 700 for the packet, the method 2200 proceeds to step 2435. Otherwise, the method 2200 proceeds to step 2460.

In step 2435, arrived at from the determination in step 2430 that the packet grant is received for the packet, the enqueue request is updated based on the packet grant. In various embodiments, the enqueue module 140 updates the enqueue request 200 of the packet based on the packet grant 700 of the packet to indicate that the grant pipeline stage 2110 has selected the packet for routing to one or more egress ports 125 of the packet identified in the enqueue request 200. As a result, the enqueue request 200 no longer indicates those egress ports 125 are destination egress ports 125 for the packet.

For example, the packet may be a multicast packet which is to be routed to multiple destination egress ports 125 and the packet grant 700 of the packet may identify some of those destination egress ports 125 for which the pipeline scheduler 145 has issued a grant. In this example, the enqueue module 140 updates the enqueue request 200 of the packet so that the enqueue request 200 indicates any remaining destination egress ports 125 for which the pipeline scheduler 145 has not yet issued a grant. The method 2200 then proceeds to step 2440.

In step 2440, it is determined whether the packet is to be routed to any additional egress port. In various embodiments, the enqueue module 140 determines whether the packet is to be routed to an additional egress port 125 based on the packet grant 700 of the packet. If the packet grant 700 of the packet identifies each egress port 125 that is identified as a destination egress port 125 of the packet in the enqueue request 200 of the packet, the enqueue module 140 determines that the packet is not to be routed to an additional egress port 125 and the method 2200 proceeds to step 2450. Otherwise, if the packet grant 700 of the packet does not identify each egress port 125 that is identified as a destination egress port 125 of the packet in the enqueue request 200 of the packet, the enqueue module 140 determines that the packet is be routed to an additional egress port 125 and the method 2200 proceeds to step 2445.

In step 2445, arrived at from the determination in step 2440 that the packet is to be routed to an additional egress port, the enqueue request is activated. In various embodiments, the enqueue module 140 activates the enqueue request 200 of the packet. For example, the enqueue module 140 may set the status flag of the enqueue request 200 indicating that the enqueue request 200 is active. Because the enqueue request 200 is active, the request pipeline stage 2105 of the pipeline scheduler 145 may again select the packet for processing, as is described more fully herein. The method 2200 then proceeds to step 2460.

In step 2450, arrived at from the determination in step 2440 that the packet is not to be routed to an additional egress port, a dequeue request is generated based on the packet grant. In various embodiments, the enqueue module 140 generates a dequeue request 1500 for the packet based on the packet grant 700 of the packet. The method 2200 then proceeds to step 2455.

In step 2455, the enqueue request is removed from the enqueue state based on the packet grant. In various embodiments, the enqueue module 140 removes the enqueue request 200 of the packet from the enqueue state 400. For example, the enqueue module 140 may remove the enqueue request 200 from the enqueue state 400 by removing the enqueue request 200 from the enqueue module 140. The method 2200 then proceeds to step 2460.

In step 2460, arrived at from step 2430 in which it is determined that a packet grant has not been received for the packet, step 2445 in which the enqueue request is activated, or step 2455 in which the enqueue request is removed from the enqueue state, it is determined whether an additional enqueue request is received. In various embodiments, the enqueue module 140 determines whether the enqueue module 140 receives an additional enqueue request 200 from the ingress port 115 corresponding to the enqueue module 140. If the enqueue module 140 determines that the enqueue module 140 receives an additional enqueue request 200, the method 2200 returns to step 2410. Otherwise the portion 2400 of the method 2200 ends.

In various embodiments, the portion 2400 of the method 2200 may include more or fewer than the steps 2405-2460 illustrated in FIG. 24 and described above. In some embodiments, the steps 2405-2460 of the method 2200 may be performed in a different order than the order illustrated in FIG. 24 and described above. In some embodiments, some of the steps 2405-2460 of the method 2200 may be performed in parallel or substantially simultaneously. In various embodiments, one or more of the steps 2405-2460 may be performed more than once in the method 2200.

Figure 25:
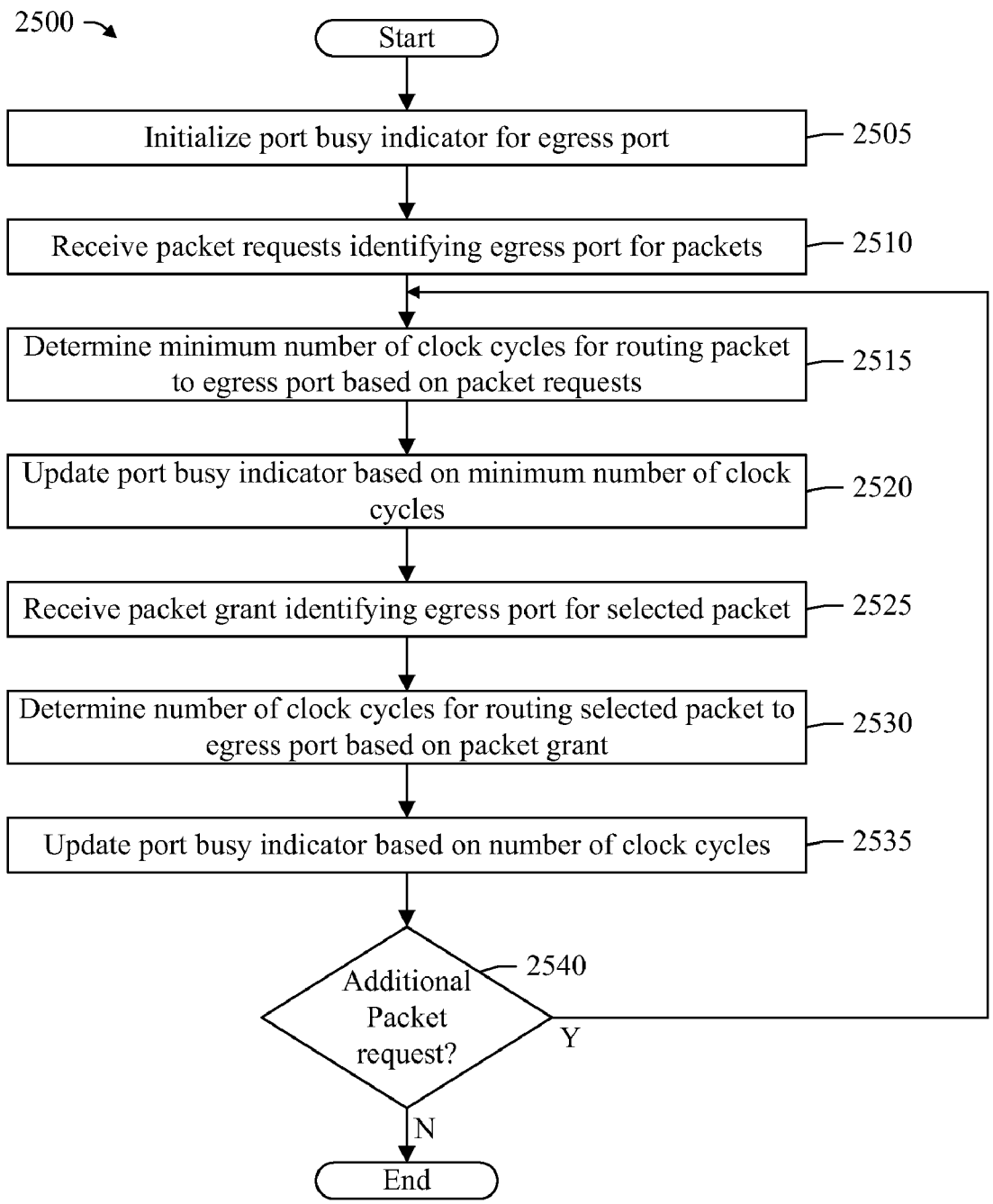
FIG. 25 is a flow chart for a portion of a method of routing packets through a packet switch, in accordance with an embodiment of the present invention.

FIG. 25 illustrates a portion 2500 of the method 2200 of routing packets through a packet switch, in accordance with an embodiment of the present invention. In various embodiments, an egress port status module 150 of the packet switch 105 performs the portion 2500 of the method 2200. Moreover, each of the egress port status modules 150 may perform the same portion 2500 of the method 2200 in parallel (e.g., substantially simultaneously). In step 2505, a port busy indicator is initialized for an egress port. In various embodiments, an egress port status module 150 initializes a port busy indicator 1405 for the egress port 125 corresponding to the egress port status module 150. For example, the egress port status module 150 may initialize the port busy indicator 1405 for the egress port 125 upon reset or power up of the packet switch 105 to indicate that the egress port 125 is not busy. The method 2200 then proceeds to step 2510.

In step 2510, packet requests identifying the egress port are received. In various embodiments, the egress port status module 150 receives packet requests 500 identifying the egress port 125. For example, the egress port status module 150 may receive the packet requests 500 for the packets from the request pipeline stage 2105 of the pipeline scheduler 145. The method 2200 then proceeds to step 2515.

In step 2515, a minimum number of clock cycles for routing a packet to the egress port is determined based on the packet requests. In various embodiments, the egress port status module 150 determines the minimum number of clock cycles for routing one of the packets to the egress port 125 based on the packet requests 500 of the packets. For example, the egress port status module 150 may determine the minimum number of credits requested for routing one of the packets to the egress port 125 based on credits requested in the packet requests 500. Further in this example, the egress port status module 150 may determine the minimum number of clock cycles for routing one of the packets to the egress port 125 based on the minimum number of requested credits. The method 2200 then proceeds to step 2520.

In step 2520, the port busy indicator is updated based on the minimum number of clock cycles. In various embodiments, the egress port status module 150 updates the port busy indicator 1405 of the egress port 125 based on the determined minimum number of clock cycles to indicate that the port will be busy for the minimum number of clock cycles when the packet is routed to the egress port 125. For example, the port busy indicator 1405 of the egress port 125 may be a port busy count and the egress port status module 150 may increment the port busy count by the minimum number of cycles. The method 2200 then proceeds to step 2525.

In step 2525, a packet grant identifying the egress port is received for a selected packet. In various embodiments, the egress port status module 150 receives a packet grant 700 for one of the packets which has been selected for routing to the egress port 125. For example, the egress port status module 150 may receive the packet grant 700 from the grant pipeline stage 2110 which has selected one of the packets and generated the packet grant 700 for the selected packet, as is described more fully herein. The method 2200 then proceeds to step 2530.

In step 2530, a number of clock cycles for routing the selected packet to the egress port is determined based on the packet grant. In various embodiments, the egress port status module 150 determines the number of clock cycles for routing the selected packet to the egress port 125 based on the packet grant 700 of the selected packet. For example, the egress port status module 150 may determine the number of credits requested for routing the selected packet to the egress port 125 based on credits requested in the packet grant 700. Further in this example, the egress port status module 150 may determine the number of clock cycles for routing the selected packet to the egress port 125 based on the number of requested credits. The method 2200 then proceeds to step 2535.

In step 2535, the port busy indicator is updated based on the number of clock cycles. In various embodiments, the egress port status module 150 updates the port busy indicator 1405 of the egress port 125 based on the determined number of clock cycles to indicate that the port will be busy for the number of clock cycles when the packet is routed to the egress port 125. For example, the port busy indicator 1405 of the egress port 125 may be a port busy count and the egress port status module 150 may increment the port busy count by an additional number of clock cycles in addition to the minimum number of cycles previously determined for routing the packet to the egress port 125. The method 2200 then proceeds to step 2540.

In step 2540, it is determined whether an additional packet request is received. In various embodiments, the egress port status module 150 determines whether the egress port status module 150 receives an additional packet request 500. For example, egress port status module 150 may receive another packet request 500 identifying the egress port 125 from the packet request pipeline stage 2105 of the pipeline scheduler 145. If the egress port status module 150 determines that an additional packet request 500 identifying the egress port 125 is received at the egress port status module 150, the method 2200 returns to step 2515, otherwise the portion 2500 of the method 2200 ends.

In various embodiments, the portion 2500 of the method 2200 may include more or fewer than the steps 2505-2540 illustrated in FIG. 25 and described above. In some embodiments, the steps 2505-2540 of the method 2200 may be performed in a different order than the order illustrated in FIG. 25 and described above. In some embodiments, some of the steps 2505-2540 of the method 2200 may be performed in parallel or substantially simultaneously. In various embodiments, one or more of the steps 2505-2540 may be performed more than once in the method 2200.

Figure 26:
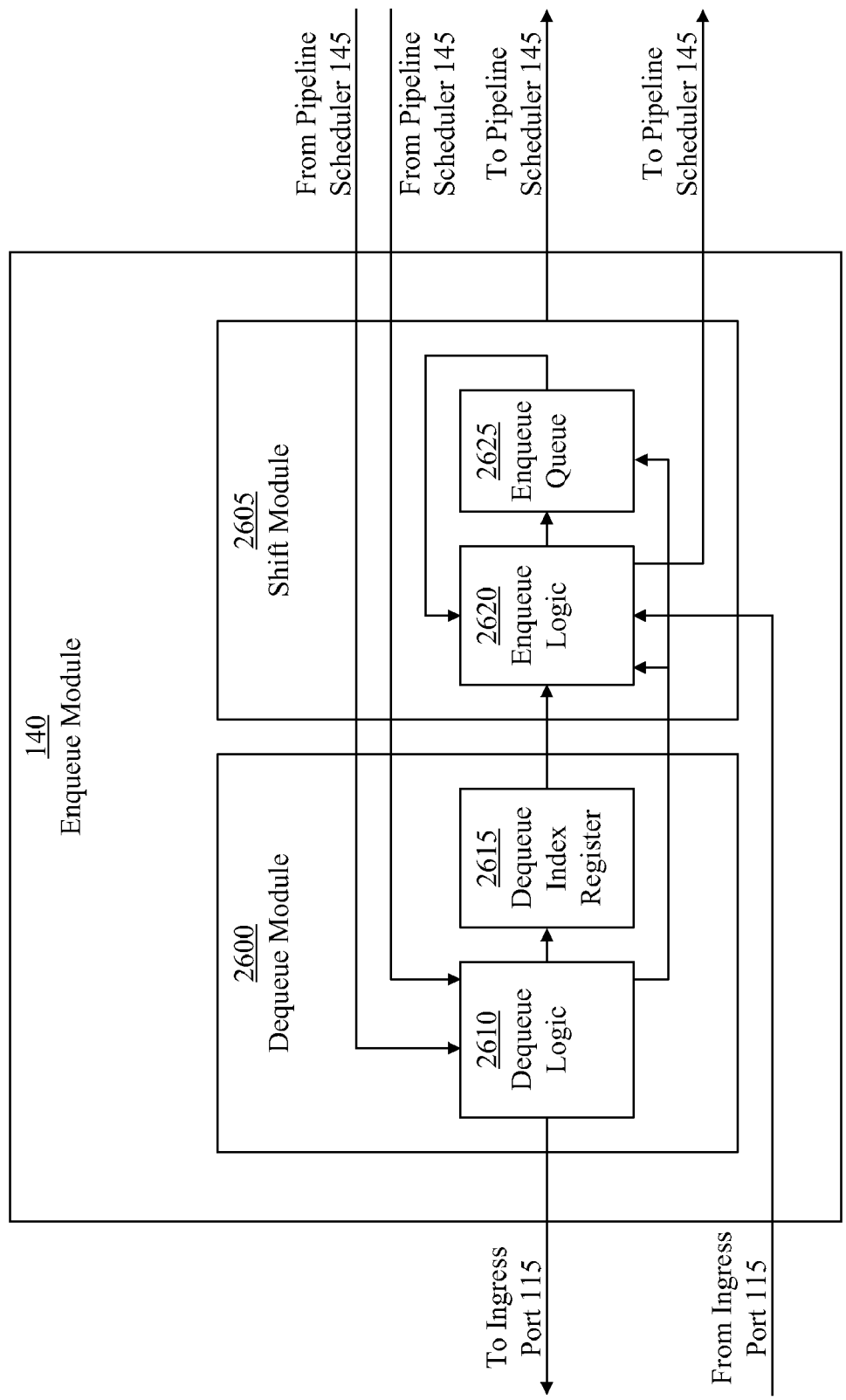
FIG. 26 is a block diagram of an enqueue module, in accordance with an embodiment of the present invention.

FIG. 26 illustrates the enqueue module 140, in accordance with an embodiment of the present invention. The enqueue module 140 includes a dequeue module 2600 and a shift module 2605. The dequeue module 2600 is coupled (e.g. connected) to the ingress port 115 corresponding to the enqueue module 140, the shift module 2605, and the pipeline scheduler 145. Additionally, the shift module 2605 is coupled (e.g., connected) to the pipeline scheduler 145. The shift module 2605 receives enqueue requests 200 from the ingress port 115 corresponding to the enqueue module 140 and stores the enqueue requests 200. In this way, the shift module 2605 generates and stores an enqueue state 400 based on the enqueue requests 200 for the corresponding ingress port 115. For example, enqueue state 400 may include the enqueue requests 200 stored in the shift module 2605.

Additionally, the dequeue module 2600 generates a dequeue request 1500 for a packet when the pipeline scheduler 145 has generated one or more packet grants 700 for the packet which identify each destination egress port 125 of the packet. The dequeue module 2600 provides the dequeue request 1500 to the ingress port 115 corresponding to the enqueue module 140 containing the dequeue module 2600 and to the shift module 2605 in the enqueue module 140. In turn, the ingress port 115 removes (e.g., deletes) the packet from the ingress port 115 and the shift module 2605 removes (e.g., deletes) the enqueue request 200 of the packet from the enqueue state 400 of the ingress port 115. In some embodiments, the dequeue module 2600 generates a dequeue request 1500 for a packet when the pipeline scheduler 145 has aborted routing the packet to an egress port 125 of the packet switch 105. For example, the pipeline scheduler 145 may abort routing a packet to an egress port 125 if the pipeline scheduler 145 determines the packet is corrupt. As another example, the pipeline scheduler 145 may abort routing a packet to an egress port 125 if the pipeline scheduler 145 generates a packet grant 700 for the packet but determines the egress port 125 is not able to accept the packet.

In some embodiments, the shift module 2605 includes enqueue logic 2620 and an enqueue queue 2625. The enqueue logic 2620 is coupled (e.g., connected) to the ingress port 115 that corresponds to the enqueue module 140, as well as the dequeue module 2600, the enqueue queue 2625, and the pipeline scheduler 145. Additionally, the enqueue queue 2625 is coupled (e.g., connected) to the pipeline scheduler 145. In these embodiments, the enqueue logic 2620 receives enqueue requests 200 from the ingress port 115 corresponding to the enqueue module 140 in the same sequential order in which the ingress port 115 receives the packets corresponding to the enqueue requests 200. Moreover, the enqueue logic 2620 stores the enqueue requests 200 into the enqueue queue 2625 such that the enqueue queue 2625 indicates the sequential order. In this way, the enqueue queue 2625 stores an enqueue state 400 including the enqueue requests 200 which indicates the sequential order of both the enqueue requests 200 and the packets corresponding to the enqueue requests 200. For example, the enqueue queue 2625 may be a first-in-first-out (FIFO) queue including registers (e.g., flop-flops) for storing the enqueue state 400 or a memory device including memory cells for storing the enqueue state 400. Moreover, the enqueue queue 2625 provides the enqueue state 400 stored in the enqueue queue 2625 to the pipeline scheduler 145. For example, the pipeline scheduler 145 may access the enqueue state 400 stored in the enqueue queue 2625.

Further in these embodiments, the dequeue module 2600 includes dequeue logic 2610 and a dequeue index register 2615. The dequeue logic 2610 is coupled (e.g., connected) to the ingress port 115 corresponding to the enqueue module 140, the dequeue index register 2615, the enqueue logic 2620, the enqueue queue 2625, and the pipeline scheduler 145. Additionally, the dequeue index register 2615 is coupled (e.g., connected) to the enqueue logic 2620. The dequeue logic 2610 receives a packet request 500 from the pipeline scheduler 145 and identifies an enqueue request 200 based on the packet request 500. Further, the dequeue logic 2610 deactivates the enqueue request 200 stored in the enqueue queue 2625 based on the packet request 500. In this way, the dequeue logic 2610 deactivates the enqueue request 200 so that the pipeline scheduler 145 does not generate another packet request 500 for the packet when the pipeline scheduler 145 is processing the packet. Furthermore, the dequeue logic 2610 actives the enqueue request 200 when the pipeline scheduler 145 is no longer processing the packet if the packet has not been routed to each destination egress port 125 of the packet.

In some embodiments, the dequeue logic 2610 provides data (e.g., a signal) to the enqueue logic 2620 identifying the enqueue request 200 and indicating the enqueue request 200 is to be deactivated. In turn, the enqueue logic 2620 deactivates the enqueue request 200 stored in the enqueue queue 2625 based on the data received from the dequeue logic 2610. Furthermore, the dequeue logic 2610 provides data (e.g., a signal) to the enqueue logic 2620 identifying the enqueue request 200 and indicating the enqueue request 200 is to be activated. In turn, the enqueue logic 2620 activates the enqueue request 200 stored in the enqueue queue 2625 based on the data received from the dequeue logic 2610. In other embodiments, the enqueue logic 2620 deactivates the enqueue request 200 based on the packet request 500 of the packet and then reactivates the enqueue request 200 if the pipeline scheduler 145 does not generate a packet grant 700 for the packet and is no longer processing the packet.

Additionally, the dequeue logic 2610 receives a packet grant 700 from the pipeline scheduler 145, identifies an enqueue request 200 based on the packet grant 700, and identifies each egress port 125 in the packet grant 700. Further, the dequeue logic 2610, modifies the enqueue request 200 stored in the enqueue queue 2625 so that the enqueue request 200 no longer identifies any of the egress ports 125 identified in the packet grant 700.

For example, the dequeue logic 2610 may provide data (e.g., a signal) to the enqueue logic 2620 identifying the enqueue request 200 and each of the egress ports 125 identified in the packet grant 700. In turn, the enqueue logic 2620 modifies the enqueue request 200 stored in the enqueue queue 2625 based on the data received from the dequeue logic 2610 by updating the destination port indicator 215 of the enqueue request 200 so that the destination port indicator 215 no longer identifies the egress ports 125 identified in the packet grant 700. In other embodiments, the enqueue logic 2620 receives the packet grant 700 from the pipeline scheduler 145 and updates the destination port indicator 215 of the enqueue request 200 so that the destination port indicator 215 no longer identifies the egress ports 125 identified in the packet grant 700.

Also in these embodiments, the dequeue logic 2610 generates a dequeue request 1500 for a packet and stores a dequeue index identifying the enqueue request 200 of the packet into the dequeue index register 2615. In turn, the enqueue logic 2620 removes (e.g., deletes) the enqueue request 200 of the packet from the queue state 400 of the ingress port 115 storing the packet based on the dequeue request 1500 by identifying the enqueue request 200 stored in the enqueue queue 2625 based on the dequeue index and removing (e.g., deleting) the enqueue request 200 from the enqueue queue 2625 based on the dequeue index.

For example, the dequeue logic 2610 of the enqueue module 140 may generate a dequeue request 1500 for a packet based on a packet grant 700 of the packet generated in a scheduling cycle of the pipeline scheduler 145 and store a dequeue index into the dequeue index register 2615 based on the dequeue request 1500 in the scheduling cycle. In this example, the enqueue logic 2620 of the enqueue module 140 removes the enqueue request 200 of the packet from the enqueue queue 2625 in the routing cycle of the pipeline scheduler 145, which follows the scheduling cycle. In this way, the dequeue index register 2615 synchronizes removal of the enqueue request 200 from the enqueue state 400 of the ingress port 115.

In various embodiments, the dequeue logic 2610 generates a dequeue request 1500 for a packet based on both the egress port indicator 800 and the credit grant indicator 805 in a packet grant 700 of the packet. In these embodiments, the dequeue logic 2610 determines the pipeline scheduler 145 has granted each destination egress port 125 identified by the egress port indicator 800 to the packet. Additionally, the dequeue logic 2610 determines a number of clock cycles for routing the packet to each destination egress port 125 based on the credit grant indicator 805. For example, the dequeue logic 2610 may determine the number of clock cycles for routing the packet to each destination egress port 125 is the same as the number of credits indicated in the credit grant indicator 805. Moreover, the dequeue logic 2610 generates the dequeue request 1500 based on the number of clock cycles determined for routing the packet to each destination egress port 125 to synchronize removal of the packet from the ingress port 115 and removal of the enqueue request 200 of the packet from the enqueue queue 2625. In this way, the dequeue logic 2610 determines when the ingress port 115 removes the packet from the ingress port 115 and the enqueue logic 2620 removes the enqueue request 200 of the packet from the enqueue queue 2625.

Figure 27:
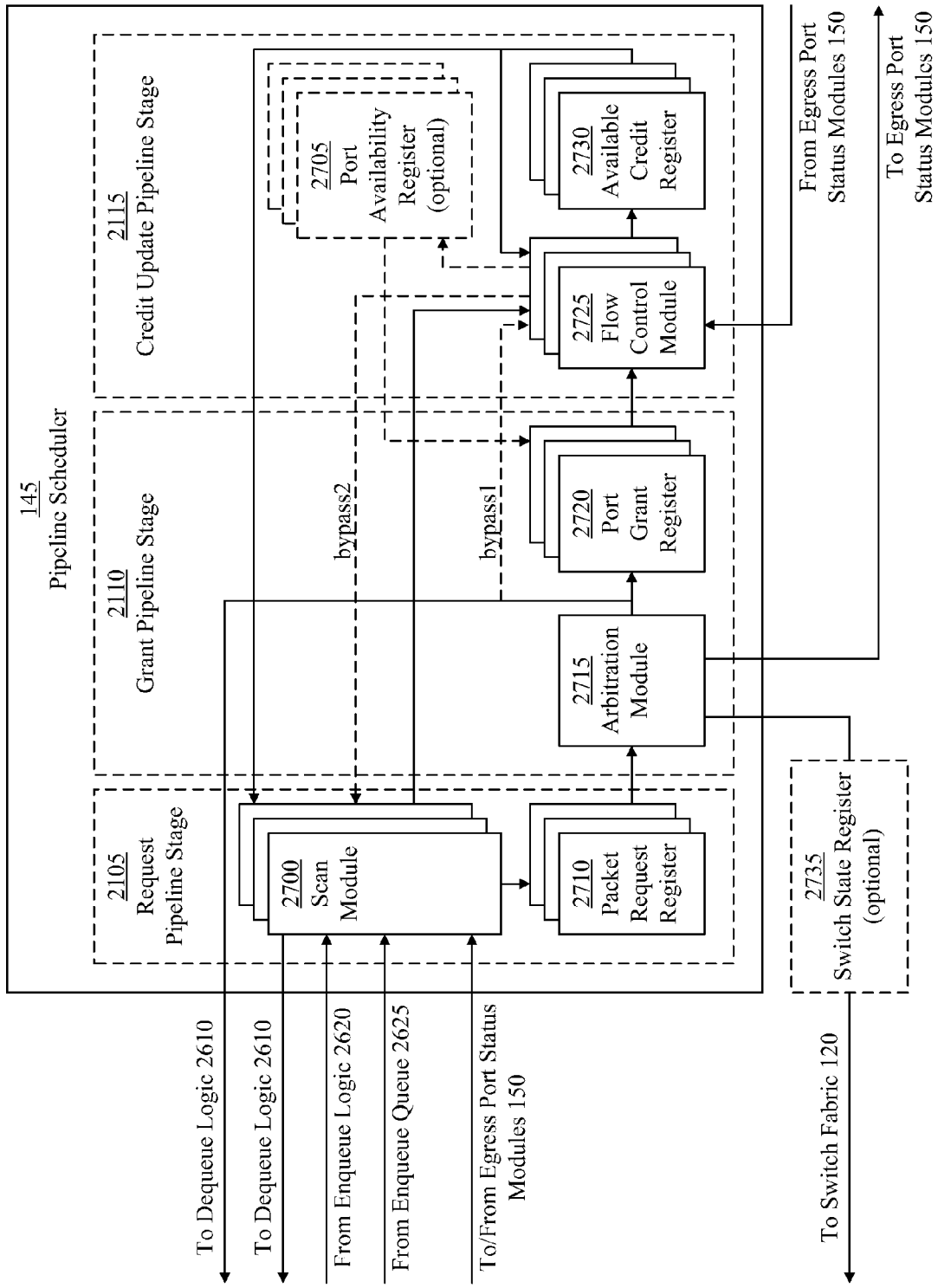
FIG. 27 is a block diagram of a pipeline scheduler, in accordance with an embodiment of the present invention.

FIG. 27 illustrates the pipeline scheduler 145, in accordance with an embodiment of the present invention. In this embodiment, the pipeline scheduler 145 includes the request pipeline stage 2105, the grant pipeline stage 2110, and the credit update pipeline stage 2115. Moreover, the request pipeline stage 2105 includes scan modules 2700 corresponding to the enqueue modules 140 and the ingress ports 115. Additionally, the request pipeline stage 2105 includes packet request registers 2710 corresponding to the scan modules 2700 and the ingress ports 115. Each of the scan modules 2700 is coupled (e.g., connected) to the corresponding enqueue module 140 and the corresponding packet request register 2710.

The scan module 2700 selects an enqueue request 200 stored in the enqueue module 140 corresponding to the scan module 2700, generates a packet request 500 based on the enqueue request 200, and stores the packet request 500 into the packet request register 2710 corresponding to the scan module 2700. In this way, the scan modules 2700 generate a packet request state 600 including packet requests 500 generated by the scan modules 2700 and store the packet request state 600 into the packet request registers 2710. Moreover, the packet request registers 2710 collectively store the packet request state 600.

In other embodiments, the request pipeline stage 2105 includes a single packet request register 2710 or a memory device for storing the packet request state 600. In various embodiments, each of the scan modules 2700 selects the enqueue request 200 in the corresponding enqueue module 140 that identifies the oldest unblocked routable packet stored in the ingress port 115 corresponding to the enqueue module 140. In this way, the scan module 2700 selects the oldest unblocked routable packet stored in the ingress port 115, as is described more fully herein. As a result, the packet requests 500 in the packet request state 600 stored in the packet request registers 2710 correspond to the oldest unblocked routable packets stored in the respective ingress ports 115.

In various embodiments, each of the scan modules 2700 in the request pipeline stage 2105 receives port busy indictors 1405 of the egress ports 125 from the egress port status modules 150. In this way, each of the scan modules 2700 receives a port busy state 1400 from the egress port status modules 150. In turn, each of the scan modules 2700 selects enqueue requests 200 and generates packet requests 500 based on the port busy state 1400, as is described more fully herein.

In various embodiments, each of the scan modules 2700 in the request pipeline stage 2105 receives port buffer status indictors 1705 of the egress ports 125 from the egress port status modules 150. In this way, each of the scan modules 2700 receives a port buffer state 1700 from the egress port status modules 150. In turn, each of the scan modules 2700 selects enqueue requests 200 and generates packet requests 500 based on the port buffer state 1700, as is described more fully herein.

The grant pipeline stage 2110 includes an arbitration module 2715 and port grant registers 2720. The arbitration module 2715 is coupled (e.g., connected) to each of the packet request registers 2710 in the request pipeline stage 2105 and to each of the port grant registers 2720 in the grant pipeline stage 2110. Moreover, the port grant registers 2720 correspond to the ingress ports 115. The arbitration module 2715 selects packets based on the packet request state 600 stored in the packet request registers 2710 of the request pipeline stage 2105 and generates packet grants 700 for at least some of the packets corresponding to packet requests 500 in the packet request state 600. Moreover, the arbitration module 2715 selects the packets so that the switch fabric 120 is capable of routing the selected packets in parallel (e.g., substantially simultaneously) to the destination egress ports 125 of the packets. Furthermore, the arbitration module 2715 generates a port grant state 900 including port grants 710 corresponding to the packet grants 700 of the selected packets. In other embodiments, the grant pipeline stage 2110 includes a single port grant register 2720 or a memory device for storing the port grant state 900.

Additionally, the arbitration module 2715 generates a switch configuration state including configuration data for configuring switches in the switch fabric 120 based on the packet grants 700. In turn, the switch fabric 120 routes the packets corresponding to the packet grants 700 to the egress ports 125 based on the switch configuration state. In some embodiments, the packet switch 105 includes an optional switch state register 2735 coupled (e.g., connected) to the grant pipeline stage 2110 and the switch fabric 120. In these embodiments, the arbitration module 2715 in the grant pipeline stage 2110 stores the switch configuration state into the switch state register 2735, and the switch fabric 120 accesses the switch configuration state in the switch state register 2735.

In various embodiments, the scan module 2700 corresponding to an ingress port 115 provides a packet request 500 to the enqueue module 140 corresponding to the ingress port 115. Additionally, the arbitration module 2715 provides a packet grant 700 corresponding to the ingress port 115 to the enqueue module 140 corresponding to the ingress port 115. In turn, the enqueue module 140 updates the enqueue request 200 of the packet stored in the enqueue module 140, generates a dequeue request 1500 for the packet, and removes the enqueue request 200 of the packet from the enqueue module 140, based on the packet request 500 and the packet grant 700, as is described more fully herein.

In various embodiments, the arbitration module 2715 provides a packet grant 700, which identifies an egress port 125 as a destination egress port 125 for a packet, to the egress port status module 150 corresponding to the egress port 125. In turn, the egress port status module 150 updates the port busy indicator 1405 of the egress port 125 based on the packet grant 700, as is described more fully herein.

The credit update pipeline stage 2115 includes flow control modules 2725 corresponding to the egress port status modules 150 and the egress ports 125. Additionally, the credit update pipeline stage 2115 includes available credit registers 2730 corresponding to the flow control modules 2725 and the egress ports 125. Each of the flow control modules 2725 is coupled (e.g., connected) to a corresponding scan module 2700 in the request pipeline stage 2105, a corresponding port grant register 2720 in the grant pipeline stage 2110, a corresponding available credit register 2730 in the credit update pipeline stage 2115, and a corresponding egress port status module 150. In some embodiments, the credit update pipeline stage 2115 includes optional port availability registers 2705 for storing port availability indicators 1805, as is described more fully herein. In these embodiments, the port availability registers 2705 are coupled (e.g., connected) to the flow control modules 2725. Furthermore, the credit update pipeline stage 2115 generates the port availability indicators 1805 of the egress ports 125 and stores the port availability indicators 1805 in the port availability registers 2705. In turn, the grant pipeline stage 2110 determines whether an egress port 125 is able to accept a packet based on the port availability indicator 1805 of the egress port 125 stored in the port availability registers 2705.

The flow control modules 2725 generate the available credit indicators 1200 of the egress ports 125 based on packet requests 500 generated by the request pipeline stage 2105 and port grants 710 generated by the grant pipeline stage 2110. Additionally, the flow control modules 2725 store the available credit indicators 1200 into the available credit registers 2730. In this way, the flow control modules 2725 generate an available credit state 1300 and store the available credit state 1300 into the available credit registers 2730. Moreover, the available credit registers 2730 collectively store the available credit state 1300. In other embodiments, the credit update pipeline stage 2115 includes a single available credit register 2730 or a memory device for storing the available credit state 1300.

In various embodiments, the arbitration module 2715 bypasses the port grant register 2720 when the grant pipeline stage 2110 generates packet grants 700 identifying the same egress port 125 in two successive scheduling cycles (e.g., two successive clock cycles of a clock signal in the pipeline scheduler 145). In some embodiments, the flow control modules 2725 generate the available credit indicators 1200 of the egress ports 125 based on packet requests 500 generated by the request pipeline stage 2105, packet grants 700 generated by the grant pipeline stage 2110, and port grants 710 generated by the grant pipeline stage 2110. In these embodiments, the arbitration module 2715 in the grant pipeline stage 2110 provides packet grants 700 to the flow control modules 2725 (bypass1). In this way, the grant pipeline stage 2110 bypasses the port grant register 2720.

Because the grant pipeline stage 2110 bypasses the port grant register 2720, the flow control modules 2725 my selectively update an available credit indicator 1200 of an egress port 125 based on a packet grant 700 in the same clock cycle in which the arbitration module 2715 generates the packet grant 700. For example, the arbitration module 2715 may generate a packet grant 700 for a packet in a scheduling cycle and an flow control module 2725 may selectively update the available credit indicator 1200 of an egress port 125 identified by the packet grant 700 in the same scheduling cycle.

In one embodiment, the request pipeline stage 2105 does not generates a packet request 500 identifying an egress port 125 unless the credits available for the egress port 125 is above a threshold credit indicator. For example, the threshold credit indicator may be a number of credits for routing a maximum sized packet to the egress port 125. Moreover, the threshold credit indicator may include additional credits to account for clock cycles between generation of a packet request 500 in a request cycle and routing of the packet by the switch fabric 120 in a routing cycle. In this way, the credit indicator compensates for pipeline delay between generation of the packet request 500 and routing of the packet. For example, the threshold credit indictor may be four more credits than the number of credits for routing a maximum sized packet to the egress port 125 to account for four clock cycles of delay.

Further in this embodiment, the credit update pipeline stage 2115 updates the available credit indicator 1200 of an egress port 125 based on a packet request 500 by the number of credits for routing a maximum sized packet. Moreover, if the grant pipeline stage 2110 generates a packet grant 700 for the egress port 125 in a clock cycle (e.g., a scheduling cycle) and the request pipeline stage 2105 generates a packet request 500 for the same egress port 125 in the same clock cycle (e.g., a request cycle), the packet corresponding to the first packet grant 700 is smaller than a maximum sized packet because the port busy indicator 1405 indicates that the egress port 125 will not be busy when the second packet is routed to the egress port 125. In this case, the arbitration module 2715 bypasses the port grant register 2720 in the same clock cycle (e.g., the scheduling cycle) and the flow control module 2725 updates the available credit indicator 1200 of the egress port 125 in the same clock cycle (e.g., a credit update cycle). As a result, the flow control module 2725 updates the available credit indicator 1200 of the egress port 125 in an earlier clock cycle in cases in which the grant pipeline stage 2110 bypasses the port grant register 2720.

In other embodiments, the credit update pipeline stage 2115 bypasses the available credit register 2730 of an egress port 125 when the grant pipeline stage 2110 generates packet grants 700 identifying the same egress port 125 in two successive scheduling cycles (e.g., two successive clock cycles of a clock signal in the pipeline scheduler 145). In these embodiments, the flow control module 2725 of the egress port 125 provides data (e.g., a signal) to the scan modules 2700 of the request pipeline stage 2105 in a clock cycle (e.g., a credit update cycle) indicating the grant pipeline stage 2110 has generated packet grants 700 identifying the same egress port 125 in two successive scheduling cycles (bypass2). In turn, the scan modules 2700 adjust the available credit indicator 1200 of the egress port 125 to indicate additional credits are available for the egress port 125 in the same clock cycle (e.g., a request cycle). As a result, the request pipeline stage 2105 may generate a packet request 500 identifying the egress port 125 in the same clock cycle (e.g., the request cycle).

Moreover, the flow control module 2725 of the egress port 125 updates the available credit indicator 1200 of the egress port 125 stored in the available credit register 2730 in the next clock cycle (e.g., the next credit update cycle) to indicate the adjustment to the available credit indicator 1200 of the egress port 125. As a result, the available credit indicator 1200 of the egress port 125 stored in the available credit register 2730 reflects the adjustment made to the available credit indicator 1200 of the egress port 125 in the previous clock cycle.

In various embodiments, a flow control module 2725 corresponding to an egress port 125 receives the advertised credit indicator 1000 of the egress port 125 from the egress port status module 150 corresponding to the egress port 125. In turn, the flow control module 2725 initializes the available credit indicator 1200 of the egress port 125 based on the advertised credit indicator 1000 of the egress port 125, as is described more fully herein. Furthermore, the flow control module 2725 updates the available credit indicator 1200 of the egress port 125 based on the advertised credit indicator 1000 of the egress port 125, as is also described more fully herein.

In various embodiments, a scan module 2700 provides a packet request 500 identifying an egress port 125 as a destination egress port 125 of a packet to the flow control module 2725 corresponding to the egress port 125. In turn, the flow control module 2725 updates the available credit indicator 1200 of the egress port 125 based on the packet request 500, as is described more fully herein.

Figure 28:
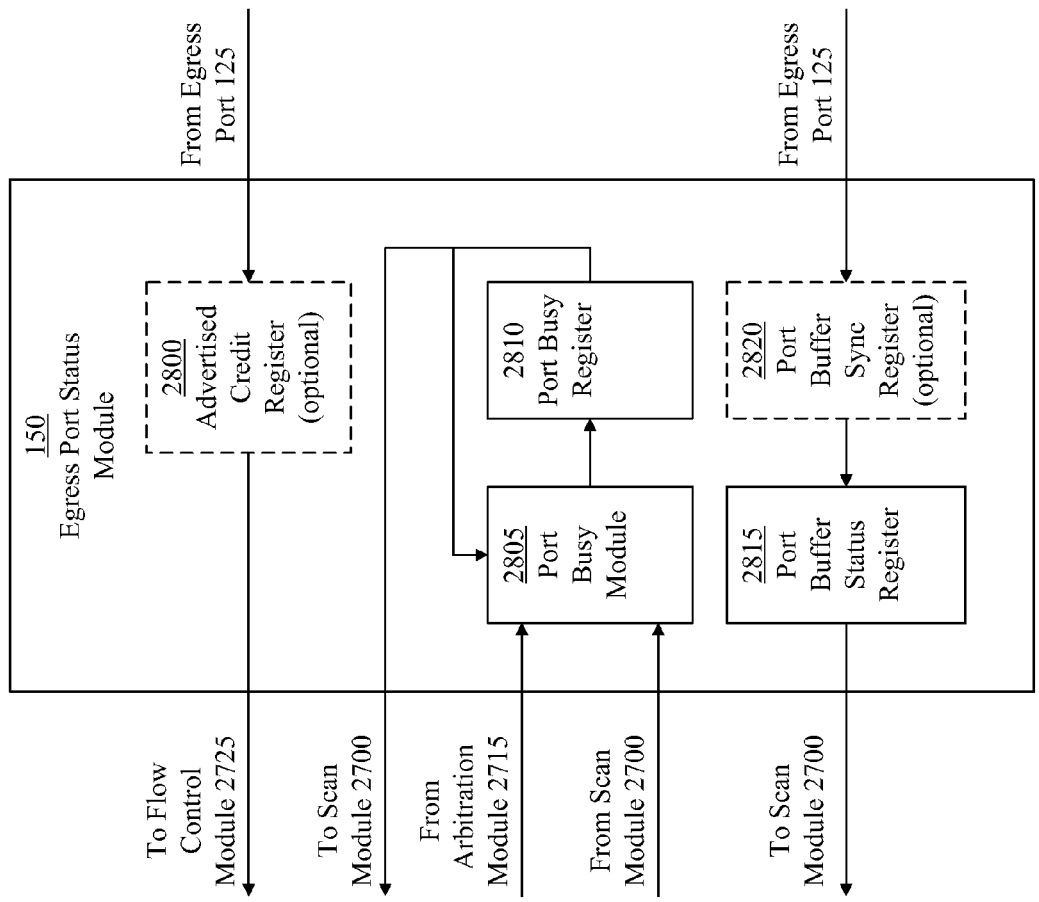
FIG. 28 is a block diagram of an egress port status module, in accordance with an embodiment of the present invention.

FIG. 28 illustrates the egress port status module 150, in accordance with an embodiment of the present invention. The egress port status module 150 includes an optional advertised credit register 2800, a port busy module 2805, a port busy register 2810, a port buffer status register 2815, and an optional port buffer synchronization register (port buffer sync register) 2820. The advertised credit register 2800 is coupled (e.g., connected) to the flow control module 2725 corresponding to the egress port status module 150 and to the egress port 125 corresponding to the egress port status module 150. The port busy module 2805 is coupled (e.g., connected) to the each scan module 2700 in the request pipeline stage 2105 of the pipeline scheduler 145, the arbitration module 2715 in the grant pipeline stage 2110 of the pipeline scheduler 145, and the port busy register 2810 in the egress port status module 150. The port buffer status register 2815 is coupled to each of the scan modules 2700 in the request pipeline stage 2105 and to the port buffer synchronization register 2820 in the egress port status module 150.

The egress port status module 150 corresponding to an egress port 125 stores the advertised credit indicator 1000 of the egress port 125 into the advertised credit register 2800 of the egress port status module 150. In turn, the flow control module 2725 corresponding to the egress port 125 accesses the advertised credit indicator 1000 stored in the advertised credit register 2800 of the egress port status module 150. In this way, the advertised credit register 2800 synchronizes updates of the advertised credit indicator 1000 by the egress port 125. Moreover, the advertised credit registers 2800 of the egress port status modules 150 collectively store an advertised credit state 1100 for the egress ports 125. In embodiments without the advertised credit register 2800, the flow control module 2725 corresponding to an egress port 125 receives the advertised credit indicator 1000 of the egress port 125 from the egress port 125.

The port busy module 2805 generates the port busy indicator 1405 of the egress port 125 corresponding to the egress port status module 150 and stores the port busy indicator 1405 in the port busy register 2810 of the egress port status module 150. Additionally, the port busy module 2805 updates the port busy indicator 1405 based on packet requests 500 identifying the egress port 125 received from the scan modules 2700 in the request pipeline stage 2105 of the pipeline scheduler 145 and packet grants 700 identifying the egress port 125 received from the arbitration module 2715 in the grant pipeline stage 2110 of the pipeline scheduler 145, as is described more fully herein. Further, the port busy module 2805 stores the updated port busy indicator 1405 into the port busy register 2810.

Moreover, the port busy registers 2810 of the egress port status modules 150 collectively store a port busy state 1400 for the egress ports 125.

The port buffer status register 2815 and the port buffer synchronization register 2820 store the port buffer status indicator 1705 of the egress port 125 corresponding to the egress port status module 150. In various embodiments, the port buffer synchronization register 2820 receives the port buffer status indicator 1705 of an egress port 125 from the egress port 125 and stores the port buffer status indicator 1705 in a clock cycle of a clock signal. In a subsequent clock cycle, the port buffer status register 2815 stores the port buffer status indicator 1705 stored in the port buffer synchronization register 2820. Also in the subsequent clock cycle, the port buffer synchronization register 2820 receives an updated port buffer status indicator 1705 of the egress port 125 from the egress port 125 and stores the updated port buffer status indicator 1705. Moreover, the port buffer status registers 2815 of the egress port status modules 150 collectively store a port buffer state 1700 for the egress ports 125. In embodiments without the port buffer synchronization register 2820, the port buffer status register 2815 receives the port buffer status indicator 1705 of an egress port 125 from the egress port 125 and stores the port buffer status indicator 1705.

Figure 29:
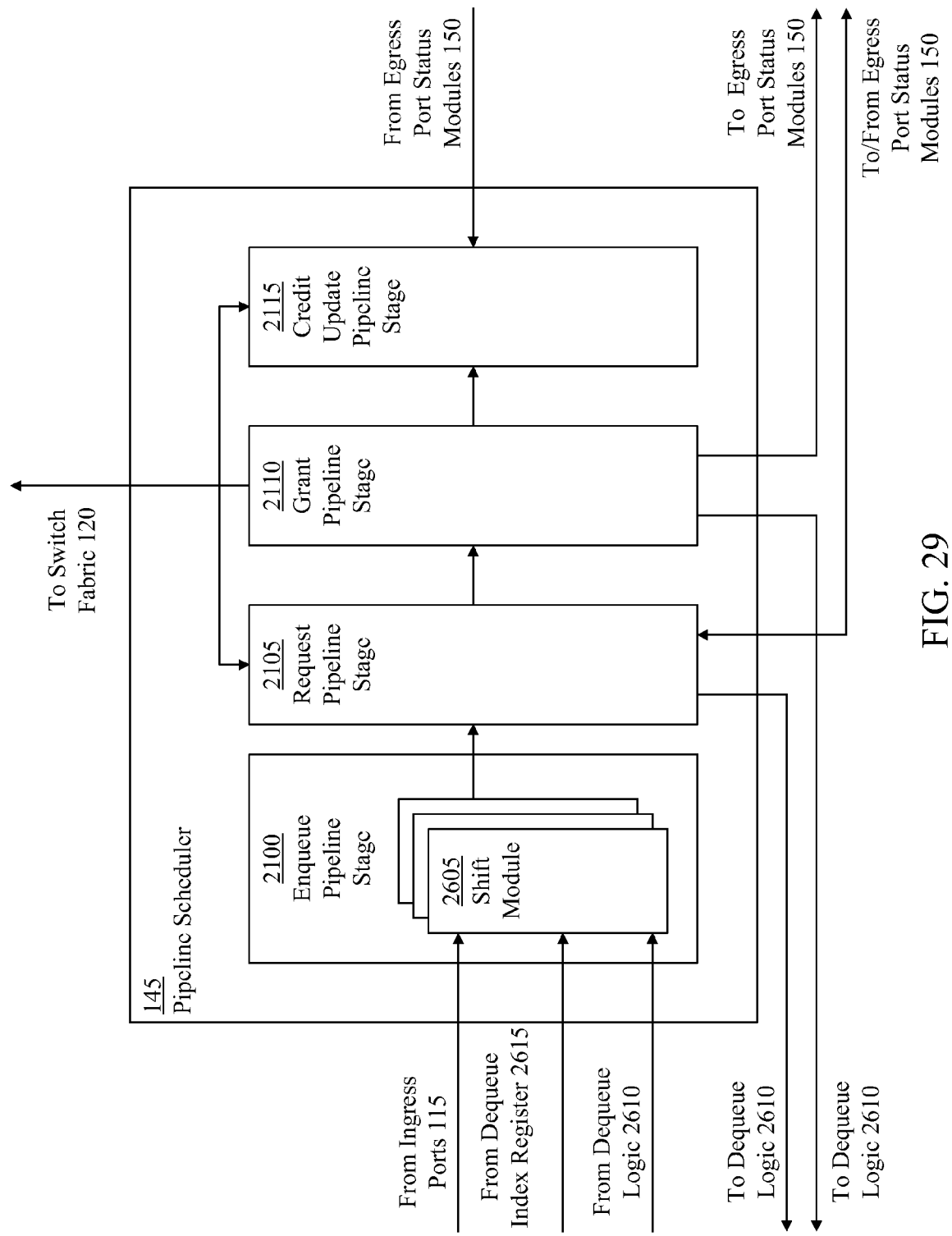
FIG. 29 is a block diagram of a pipeline scheduler, in accordance with an embodiment of the present invention.

FIG. 29 illustrates the pipeline scheduler 145, in accordance with an embodiment of the present invention. In this embodiment, the pipeline scheduler 145 includes the enqueue pipeline stage 2100, the request pipeline stage 2105, the grant pipeline stage 2110, and the credit update pipeline stage 2115. Moreover, the enqueue pipeline stage 2100 includes the shift modules 2605. In various embodiments, the enqueue pipeline stage 2100 generates enqueue states 400 for the ingress ports 115 in an enqueue cycle based on enqueue requests 200 generated by the ingress ports 115. The request pipeline stage 2105 generates a packet request state 600 based on the enqueue states 400 and the available credit state 1300. In some embodiments, the request pipeline stage 2105 generates the packet request state 600 based on both the available credit state 1300 and the port busy state 1400, as is described more fully herein. The grant pipeline stage 2110 generates packet grants 700 based on the packet request state 600 and generates a port grant state 900 based on the packet grants 700. The credit update pipeline stage 2115 generates the available credit state 1300 based on the port grant state 900. In some embodiments, the credit update pipeline stage 2115 updates the available credit state 1300 based on the packet request state 600 and the port grant state 900, as is described more fully herein. In some embodiments, the credit update pipeline stage 2115 updates the available credit state 1300 based on the packet request state 600, the port grant state 900, and the advertised credit state 1100, as is described more fully herein.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch comprising:
ingress ports configured to receive packets;
egress ports configured to advertise credits corresponding to the egress ports;
a pipeline scheduler coupled to the ingress ports and the egress ports, the pipeline scheduler comprising:
a request pipeline stage configured to generate packet requests corresponding to the packets based on an available credit state and store a packet request state including the packet requests, each of the packet requests identifying at least one of the egress ports as a destination egress port for the corresponding packet and credits requested for routing the corresponding packet to the destination egress port;
a grant pipeline stage configured to select packets based on the packet request state, generate port grants corresponding to the selected packets and store a port grant state including the port grants; and
a credit update pipeline stage configured to initialize the available credit state based on the advertised credits, store the available credit state, and update the available credit state based on the port grant state by determining a minimum number of credits requested for routing a packet to an egress port based on the packet requests, updating an available credit indicator corresponding to the egress port to indicate the minimum credits are requested for routing a packet to the egress port and updating the available credit indicator corresponding to the egress port based on a port grant corresponding to the packet and identifying the egress port to indicate additional credits requested for routing the packet to the egress port; and
a switch fabric coupled to the ingress ports, the egress ports, and the pipeline scheduler, the switch fabric configured to route each of the selected packets to each destination egress port of the selected packet.

2. The packet switch of claim 1, wherein the egress ports are further configured to update the advertised credits based on the port grants.

3. The packet switch of claim 1, wherein the ingress ports are configured to generate enqueue requests corresponding to the packets, each of the enqueue request identifying the corresponding packet, the destination egress port of the corresponding packet, and credits requested for routing the corresponding packet to the destination egress port of the corresponding packet, and wherein the request pipeline stage is further configured to generate the packet requests based on corresponding enqueue requests, each of the packet requests further identifying the enqueue request corresponding to the packet request.

4. The packet switch of claim 3, further comprising shift modules corresponding to the ingress ports and configured to generate enqueue states corresponding to the ingress ports by generating each of the enqueue states based on the enqueue requests generated by the corresponding ingress port, the request pipeline stage further configured to store the enqueue states.

5. The packet switch of claim 3, wherein the pipeline scheduler further comprises an enqueue pipeline stage comprising the shift modules.

6. The packet switch of claim 4, wherein the request pipeline stage further comprises scan modules corresponding to the shift modules, each of the scan modules configured to select an enqueue request identifying an oldest routable packet stored in the corresponding ingress port based on the enqueue state of the corresponding shift module and further configured to generate a packet request based on the selected enqueue request.

7. The packet switch of claim 1, wherein the egress ports are further configured to generate port busy indicators corresponding to the egress ports, the packet switch further comprising port busy registers configured to store a port busy state including the port busy indicators, wherein the grant pipeline stage comprises an arbitration module configured to select routable unblock packets based on the packet request state, the available credit state, and the port busy state, and wherein the grant pipeline stage is further configured to generate a port grant of the port grant state for each selected routable unblocked packet.

8. The packet switch of claim 1, wherein the available credit state includes available credit indicators corresponding to the egress ports, each of the available credit indicators indicating available credits for the corresponding egress port.

9. A packet switch comprising:
ingress ports configured to receive packets and generate enqueue requests corresponding to the packets, each of the enqueue requests identifying the corresponding packet, the destination egress port of the corresponding packet, and credits requested for routing the corresponding packet to the destination egress port of the corresponding packet;
egress ports configured to advertise credits corresponding to the egress ports;
a pipeline scheduler coupled to the ingress ports and comprising:
an enqueue pipeline stage comprising shift modules corresponding to the ingress ports and configured to generate enqueue states corresponding to the ingress ports by generating each of the enqueue states based on the enqueue requests generated by the corresponding ingress port, the request pipeline stage further configured to store the enqueue states;
a request pipeline stage configured to select enqueue requests corresponding to the ingress ports based on the enqueue states and an available credit state, generate packet requests corresponding to the selected enqueue requests, and store a packet request state including the packet requests, wherein each of the packet requests identifies the destination egress port for the corresponding packet, the credits requested for routing the corresponding packet to the destination egress port of the corresponding packet, and the selected enqueue request corresponding to the packet request;
a grant pipeline stage configured to select packets based on the packet request state, generate port grants corresponding to the selected packets, and store a port grant state including the port grants; and
a credit update pipeline stage configured to initialize the available credit state based on the advertised credits, store the available credit state, and update the available credit state based on the port grant state, wherein the available credit state includes available credit indicators corresponding to the egress ports, each of the available credit indicators indicating credits available for routing a packet to the egress port corresponding to the available credit indicator, wherein the credit update pipeline stage is further configured to determine a minimum number of credits requested for routing a packet to an egress port based on the packet requests and update the available credit indicator corresponding to the egress port to indicate the minimum credits are requested for routing a packet to the egress port, the credit update pipeline stage further configured to update the available credit indicator corresponding to the egress port based on a port grant corresponding to the packet and identifying the egress port to indicate additional credits requested for routing the packet to the egress port; and
a switch fabric coupled to the ingress ports, the egress ports, and the pipeline scheduler, the switch fabric configured to route each of the selected packets to each destination egress port of the selected packet.

10. The packet switch of claim 9, wherein the egress ports are further configured to update the advertised credits based on the port grants.

11. The packet switch of claim 9, wherein each of the shift modules comprises an enqueue queue configured to store enqueue requests generated by the corresponding ingress port.

12. The packet switch of claim 11, wherein the request pipeline stage further comprises scan modules corresponding to the shift modules, each of the scan modules configured to select an enqueue request stored in the enqueue queue of the corresponding shift module identifying an oldest routable packet stored in the corresponding ingress port based on the enqueue state of the corresponding shift module and further configured to generate a packet request based on the selected enqueue request.

13. The packet switch of claim 9, wherein the egress ports are further configured to generate port busy indicators corresponding to the egress ports, the packet switch further comprising port busy registers configured to store a port busy state including the port busy indicators, wherein the grant pipeline stage comprises an arbitration module configured to select routable unblock packets based on the packet request state, the available credit state, and the port busy state, and wherein the grant pipeline stage is further configured to generate a port grant of the port grant state for each selected routable unblocked packet.

14. A method of routing packets through a packet switch, the method comprising:
advertising credits corresponding to egress ports of a packet switch;
initializing an available credit state based on the advertised credits;
storing the available credit state in a credit update pipeline stage of the packet switch;
receiving packets at ingress ports of the packet switch;
generating packet requests corresponding to the packets based on the available credit state, each of the packet requests identifying at least one of the egress ports as a destination egress port for the corresponding packet;
storing a packet request state including the packet requests in a request pipeline stage of the packet switch;
selecting packets based on the packet request state;
generating port grants corresponding to the selected packets;
storing a port grant state including the port grants in a grant pipeline stage of the packet switch;
routing each of the selected packets to each destination egress port of the selected packet; and
updating the available credit state based on the port grant state by:
determining a minimum number of credits requested for routing a packet to an egress port based on the packet requests;
updating an available credit indicator corresponding to the egress port to indicate the minimum number of credits requested for routing a packet to the egress port; and
updating the available credit indicator corresponding to the egress port to indicate additional credits requested for routing the packet to the egress port based on a port grant identifying the egress port.

15. The method of claim 14, further comprising updating the advertised credits based on the port grants.

* * * * *